(12) United States Patent
Bush

(10) Patent No.: US 8,724,619 B2
(45) Date of Patent: May 13, 2014

(54) TRANSPARENTLY ROUTING A TELEPHONE CALL BETWEEN MOBILE AND VOIP SERVICES

(75) Inventor: Jeff Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1597 days.

(21) Appl. No.: 12/045,312

(22) Filed: Mar. 10, 2008

(65) Prior Publication Data

US 2009/0168757 A1 Jul. 2, 2009

Related U.S. Application Data

(60) Provisional application No. 61/018,187, filed on Dec. 31, 2007.

(51) Int. Cl.
*H04L 12/66* (2006.01)

(52) U.S. Cl.
USPC .......................................................... 370/352

(58) Field of Classification Search
USPC ......... 370/352, 237, 329, 338, 466, 515, 331, 370/229; 455/422.1, 417, 41.2, 518, 445, 455/436, 403; 709/203; 348/14.12, 515
See application file for complete search history.

(56) References Cited

U.S. PATENT DOCUMENTS

| | | | |
|---|---|---|---|
| 6,161,007 A | 12/2000 | McCutcheon et al. | |
| 6,185,291 B1 | 2/2001 | Miloslavsky | |
| 6,697,097 B1 * | 2/2004 | Parker et al. | 348/14.12 |
| 6,760,324 B1 | 7/2004 | Scott et al. | |
| 7,006,625 B2 | 2/2006 | Rodriguez et al. | |
| 7,016,338 B2 | 3/2006 | Gunn et al. | |
| 7,107,605 B2 | 9/2006 | Janik | |
| 7,120,241 B1 | 10/2006 | Fuoss et al. | |
| 7,123,608 B1 | 10/2006 | Scott et al. | |
| 7,130,616 B2 | 10/2006 | Janik | |
| 7,142,934 B2 | 11/2006 | Janik | |
| 7,142,935 B2 | 11/2006 | Janik | |
| 7,167,765 B2 | 1/2007 | Janik | |
| 7,184,786 B2 | 2/2007 | Mumick et al. | |
| 7,251,484 B2 | 7/2007 | Aslanian | |
| 7,274,684 B2 | 9/2007 | Young et al. | |
| 7,283,808 B2 | 10/2007 | Castell et al. | |
| 7,330,465 B2 | 2/2008 | Patfield et al. | |
| 7,373,141 B2 | 5/2008 | Kwon | |
| 7,376,221 B1 | 5/2008 | Remy et al. | |
| 7,380,022 B2 | 5/2008 | Tell et al. | |

(Continued)

FOREIGN PATENT DOCUMENTS

WO    WO2006118106    * 11/2006 ............... H04N 5/60

*Primary Examiner* — Asad Nawaz
*Assistant Examiner* — Parth Patel
(74) *Attorney, Agent, or Firm* — Womble Carlyle Sandridge & Rice LLP

(57) ABSTRACT

Systems and methods are provided for routing a telephone call intended for a communications device between a mobile network and a VOIP service, where the mobile network and VOIP service may be connected through the PSTN. The VOIP service may receive telephone calls and may direct the telephone calls to the communications device through the Internet when a stable Internet connection is present, and may route telephone calls to the mobile network through the PSTN otherwise. When a call is routed to the mobile network, the mobile network may make the call the communications device to establish a telephone connection through a cellular link. While a telephone call is in progress, the VOIP service and communications device may be configured to seamlessly switch the telephone call to a different service depending on the status of the communications device's Internet connection.

16 Claims, 14 Drawing Sheets

(56) References Cited

U.S. PATENT DOCUMENTS

| | | |
|---|---|---|
| 7,400,881 B2 | 7/2008 | Kallio |
| 7,412,257 B2 | 8/2008 | Loveland |
| 7,433,464 B2 | 10/2008 | Grant et al. |
| 7,668,515 B2 | 2/2010 | Mayblum et al. |
| 7,761,579 B2 | 7/2010 | Khasnabish |
| 7,782,876 B2 | 8/2010 | Rogalski et al. |
| 7,835,751 B2 | 11/2010 | Ibe et al. |
| 2001/0012357 A1 | 8/2001 | Mirashrafi et al. |
| 2002/0009071 A1 | 1/2002 | Yaary et al. |
| 2002/0085516 A1* | 7/2002 | Bridgelall .................... 370/329 |
| 2002/0136226 A1 | 9/2002 | Christoffel et al. |
| 2003/0023672 A1* | 1/2003 | Vaysman ...................... 709/203 |
| 2004/0052339 A1 | 3/2004 | Mirashrafi et al. |
| 2005/0064818 A1* | 3/2005 | Assarsson et al. ........... 455/41.2 |
| 2005/0190747 A1* | 9/2005 | Sindhwani et al. ........... 370/352 |
| 2005/0288047 A1* | 12/2005 | Ananthanarayanan et al. ............................. 455/518 |
| 2006/0002355 A1 | 1/2006 | Baek et al. |
| 2006/0114883 A1* | 6/2006 | Mehta et al. ................. 370/352 |
| 2006/0153155 A1* | 7/2006 | Jacobsen et al. ............. 370/338 |
| 2006/0178138 A1 | 8/2006 | Ostroff et al. |
| 2006/0285489 A1* | 12/2006 | Francisco et al. ............ 370/229 |
| 2006/0286984 A1* | 12/2006 | Bonner ......................... 455/445 |
| 2007/0091848 A1* | 4/2007 | Karia et al. ................... 370/331 |
| 2007/0112964 A1 | 5/2007 | Guedalia et al. |
| 2007/0123192 A1* | 5/2007 | Sinai ............................ 455/403 |
| 2007/0123259 A1* | 5/2007 | Huang et al. ................. 455/436 |
| 2007/0153768 A1 | 7/2007 | Jagadesan et al. |
| 2007/0160034 A1 | 7/2007 | Koretsky |
| 2007/0171898 A1 | 7/2007 | Salva |
| 2007/0183396 A1 | 8/2007 | Bennett et al. |
| 2007/0183397 A1 | 8/2007 | Bennett |
| 2007/0183398 A1 | 8/2007 | Bennett et al. |
| 2007/0183399 A1 | 8/2007 | Bennett |
| 2007/0183400 A1 | 8/2007 | Bennett et al. |
| 2007/0183401 A1 | 8/2007 | Bennett |
| 2007/0183405 A1 | 8/2007 | Bennett |
| 2007/0183407 A1 | 8/2007 | Bennett et al. |
| 2007/0189280 A1 | 8/2007 | Hancock |
| 2007/0201451 A1 | 8/2007 | Bennett |
| 2007/0281680 A1* | 12/2007 | Raju et al. ................... 455/422.1 |
| 2007/0291648 A1* | 12/2007 | Pfleging et al. .............. 370/237 |
| 2008/0032686 A1* | 2/2008 | Xu et al. ...................... 455/422.1 |
| 2008/0192770 A1* | 8/2008 | Burrows et al. .............. 370/466 |
| 2009/0059896 A1 | 3/2009 | Stober et al. |
| 2009/0073316 A1* | 3/2009 | Ejima ........................... 348/515 |
| 2009/0245236 A1 | 10/2009 | Scott et al. |
| 2009/0252121 A1* | 10/2009 | Xia et al. ..................... 370/331 |
| 2010/0184418 A1* | 7/2010 | Noldus et al. ................ 455/417 |

* cited by examiner

US 8,724,619 B2

TRANSPARENTLY ROUTING A TELEPHONE CALL BETWEEN MOBILE AND VOIP SERVICES

CROSS-REFERENCE TO RELATED APPLICATION

This application claims benefit under 35 U.S.C. §119(e) of U.S. Provisional Application No. 61/018,187, filed Dec. 31, 2007, which is hereby incorporated by reference herein in its entirety.

FIELD OF THE INVENTION

This can relate to routing telephone calls, and more particular, to routing telephone calls connected to a communications device seamlessly between mobile and voice over IP ("VOIP") services.

BACKGROUND OF THE DISCLOSURE

The popularity of fixed mobile convergence ("FMC") is continually growing. Fixed mobile convergence refers to any technology that can route telephone calls between different communications networks (e.g., the mobile network and VOIP/Internet) during a call. Examples of known FMC protocols include the Unlicensed Mobile Access/Generic Access Network (UMA/GAN) and the IP Multimedia Subsystem (IMS). These and other architectures, however, are not compatible with telephony networks that are currently in place. In particular, implementing these protocols may require extensive changes in the protocol code running on existing mobile telephones and may require major network changes in existing mobile networks.

Furthermore, the UMA/GAN, IMS, or other known fixed mobile convergence architectures operate through the mobile network. These architectures, in particular, are extensions of the mobile network, and may require continual usage of the mobile network even when an FMC-enabled mobile telephone is connected to a VOIP service. The service provider for a mobile network typically charges users based on the amount of time of mobile network usage, and these charges may be considerable. VOIP services, on the other hand, do not typically subject users to such hefty charges. Therefore, it would be beneficial to provide an approach to fixed mobile convergence that can circumvent the mobile network when a communications device (e.g., a mobile telephone) is connected to the VOIP service. Moreover, it would be beneficial for these approaches to operate without requiring major changes in existing telephone systems.

SUMMARY OF THE DISCLOSURE

Accordingly, systems and methods are provided for seamlessly routing and switching telephone calls for a communications device seamlessly between a mobile network and a VOIP service.

A telephony system can include a mobile network, a public switched telephone network ("PSTN"), and a VOIP service coupled to the Internet. These networks can be interconnected, where the mobile network and the VOIP service can communicate with one another through the PSTN. Because the mobile network and VOIP service are connected through the PSTN, a telephone call can be received by a communications device using either type of network regardless of where the telephone call originated from. For example, a telephone call from a VOIP user can be transmitted to the communications device through the VOIP service/Internet. Alternatively, the telephone call can be transmitted from the VOIP service to the mobile network through the PSTN, and finally from the mobile network to the communications device through a cellular link.

In one embodiment of the invention, the VOIP service can act as a gateway or proxy between a remote party and a communications device (e.g., a mobile telephone). A first telephone call from the remote party that is intended for the communications device can be received by the VOIP service from, for example, a computer system coupled to the Internet. The VOIP service can determine whether the communications device has a stable Internet connection, such as a Wi-Fi connection of at least a predetermined signal strength. The VOIP service can direct the first telephone call to the communications device through the Internet connection when the communications device has a stable Internet connection. The VOIP service can instead route the first telephone call to the mobile network through the PSTN when the communications device does not have a stable Internet connection. This can be accomplished, for example, using the standard Explicit Call Transfer ("ECT") mechanism provided by Integrated Services Digital Network ("ISDN") telephone networks. The mobile network can then make the first telephone call to the communications device over a cellular link.

Thus, when the communications device does not have a stable Internet connection, the first telephone call can be connected to the communications device through the mobile network/cellular connection. At a later time, the communications device may develop a stable Internet connection if, for example, the communications device is moved to a location with a nearby Wi-Fi router. Thus, while the first telephone call is in progress, the VOIP service can be further operable to determine whether the communications device has developed a stable Internet connection. If so, a second telephone call can be automatically connected between the VOIP service and the communications device. For example, in response to identifying the presence of a stable Internet connection, the VOIP service can make a second telephone call to the communications device through the VOIP service/Internet on behalf of the remote party, or the communications device can call the remote party through the VOIP service. Once the second telephone call is connected, the first telephone call through the mobile network can be disconnected such that a telephone connection between the communications device and the remote party is maintained through the VOIP service/Internet.

The VOIP service can likewise forward telephone calls from the VOIP service to the mobile network. When the communications device has a stable Internet connection, the communications device can maintain a first telephone call with the remote party using the VOIP service. If the strength of the Internet connection falls below a predetermined threshold, a second telephone call can be automatically connected between the VOIP service and the communications device through the mobile network. That is, the communications device can be connected to the VOIP service via the second telephone call using a cellular connection and through the mobile network and PSTN. In some embodiments, the VOIP service can forward the first telephone call to the mobile network using the ECT protocol, and the mobile network can make the call to the communications device. In other embodiments, the communications device can call the VOIP service through the mobile network. Once the second telephone call is automatically connected through a cellular connection, the first telephone call connected to the communications device through the Internet may be disconnected by the VOIP service or the communications device.

In another embodiment of the invention, the mobile network can act as the gateway or proxy between a remote caller and a communications device. A first telephone call intended for the communications device can be received from the remote party by the mobile network. The remote party may be, for example, a mobile telephone coupled to the mobile network or a fixed telephone calling the mobile network. The mobile network can determine whether to connect the first telephone call through a cellular link. This determination may be based on, for example, whether the remote party is registered on the mobile network or whether the communications device has a stable cellular connection. If the mobile network determines that the first telephone call should be placed through the cellular link, the mobile network can route the first telephone call to the communications device through the mobile network and cellular link. Otherwise, the mobile network can be configured to use existing call forwarding features to route the first telephone call to the VOIP service through the PSTN, where the VOIP service can make the telephone call to the communications device over an Internet connection.

Thus, the first telephone call can be connected to the communications device through either the mobile network or the VOIP service. Similar to the embodiment where the VOIP service acts as the proxy, when the mobile network acts as the proxy, the VOIP service and communications device can be configured to transfer telephone calls from a current service to the other service when the status of the Internet connection changes. For example, when the first telephone call is connected to the communications device through the mobile network, the communications device can determine whether the communications device has developed a stable Internet connection. If so, the communications device can request that the mobile network forward the first call to the VOIP service over the PSTN using the Explicit Call Transfer (ECT) service. The VOIP service may receive the call, then make a second call to the communications device over VOIP. In response to receiving the second telephone call, the communications device can switch the audio stream from the cellular connection to the VOIP connection.

The communications device and the VOIP service can also be configured to transfer telephone calls from the VOIP service to the mobile network when the mobile network acts as the proxy. When the communications device has a stable Internet connection, the communications device can maintain a first telephone call using the VOIP service. If the strength of the Internet connection falls below a predetermined threshold, the communications device can switch from the first telephone call to a second telephone call connected via a cellular connection. The second telephone call may be made by the VOIP service to the communications device through the mobile network or the communications device may call the VOIP service through the cellular connection and mobile network.

In some embodiments of the invention, the communications device may be operable to seamlessly switch telephone calls between a first communications network and a second communications network when the calls are from the same remote caller. The first network may be, for example, the mobile network and the second network may be the VOIP/Internet. The communications device can connect a first telephone call through the first communications network to establish a telephone connection between the communications device and a remote party. The communications device may then receive a second telephone call from the second communications network. The communications device may determine whether the second telephone is from the same caller as the first telephone call (e.g., also from the remote party) by, for example, comparing the IP addresses or the telephone numbers of the two telephone calls. If the second telephone call is from the same caller, the communications device can automatically and seamlessly (e.g., without request from a user) switch from the first telephone call to the second telephone call. Thus, the telephone connection between the communications device and the remote caller can be maintained through the second communications network.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
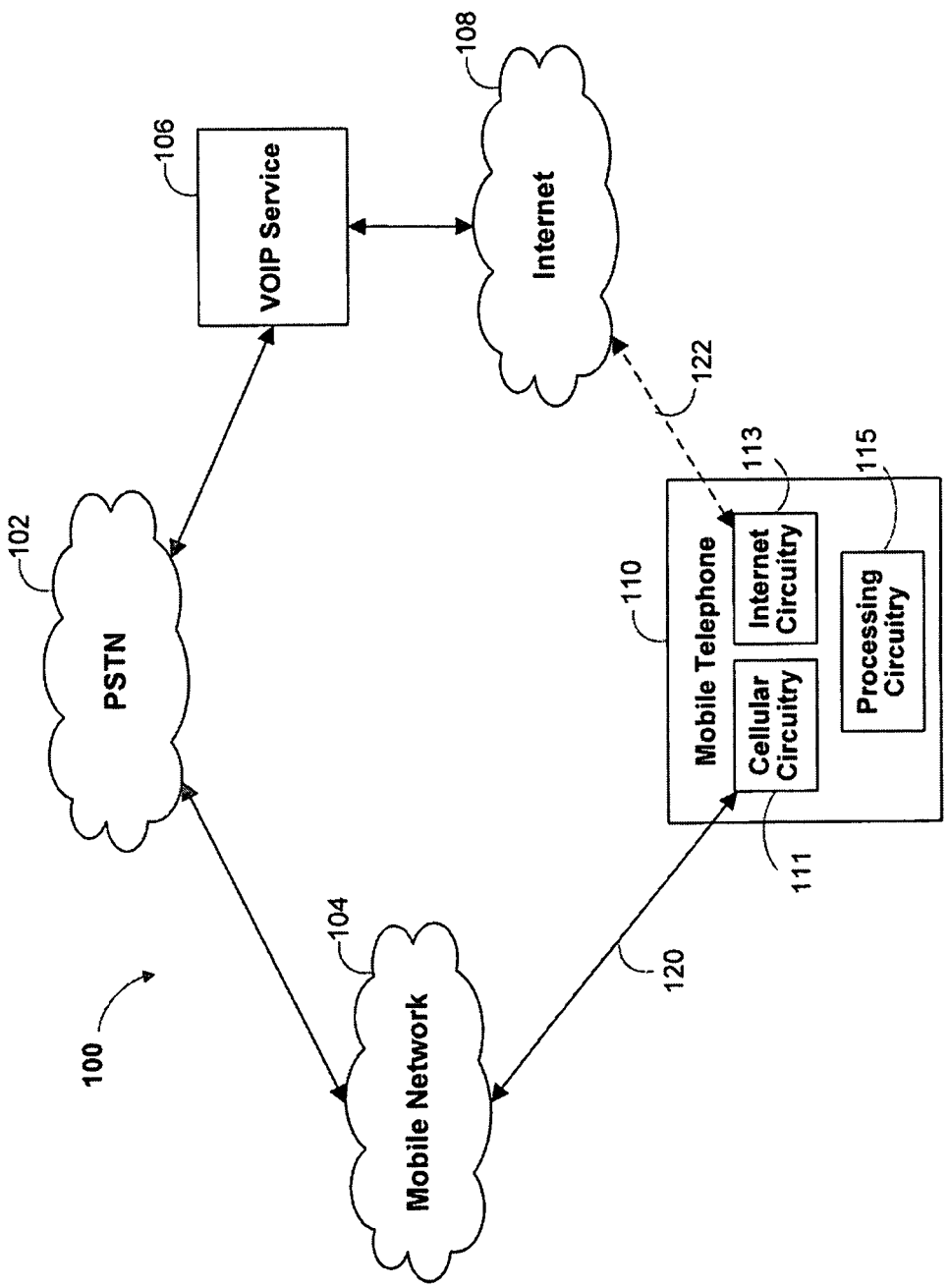
FIG. 1 shows a simplified block diagram of a telecommunications system in accordance with an embodiment of the invention.

FIG. 1 shows a simplified block diagram of telecommunications system 100. Telecommunications system 100 can include PSTN 102, mobile network 104, VOIP service 106, Internet 108, and mobile telephone 110. PSTN 102 can be the public switched telephone network ("PSTN") that interconnects and enables communications between fixed telephones, and can interconnect any suitable number of fixed telephones across the globe. PSTN 102 can encompass or can be coupled to mobile network 104 and VOIP service 106. In this way, PSTN 102 can enable communication between not only fixed telephones, but also mobile telephones or computer systems. For simplicity, PSTN 102, mobile network 104, and Internet 108 may sometimes be referred to collectively as "the telephony network."

Mobile network 104 can be a cellular network, and can be a network provided by a particular mobile service provider (e.g., AT&T). Mobile network 104 can allow mobile telephones connected to mobile network 104 to communicate with one another, as well as with other telephone systems (e.g., fixed telephones) connected to the telephony network. Mobile network 104 can include any suitable number of base stations that are each able to transmit and receive information-carrying radio signals. These base stations can communicate with compatible mobile telephones within its radio range, including with mobile telephone 110. To transfer information to and from the base stations, mobile network 104 can operate based on one of a variety of protocols, such as code division multiple access ("CDMA") or global system for mobile communications ("GSM").

PSTN 102 can also interface with VOIP service 106. VOIP service 106 can implement a voice over IP ("VOIP") technology for providing an interface between PSTN 102 and Internet 108 that is especially suitable for voice transmissions. That is, VOIP service 106 can convert voice information transferred via PSTN 102 to a format that can be transmitted through Internet 108, and vice versa. VOIP service 106, therefore, enables users of an Internet-ready computer system or other electronic system to speak with one another using an Internet connection. VOIP service 106 also enables the Internet-ready computer system and other Internet-ready electronic systems to exchange voice information with any of the other telephone system (e.g., a fixed telephone) connected to the telephony network.

With continued reference to FIG. 1, telecommunications system 100 can include mobile telephone 110. Mobile telephone 110 can be any communications device that can accept telephone calls from mobile network 104 and Internet 108. For example, mobile telephone can include cellular communications circuitry 111 that interfaces with mobile network 104 and Internet communications circuitry 113 that interfaces with Internet 108, as well as processing circuitry 115 for controlling these communications circuitries. Cellular communications circuitry 111 can include a GSM-based or CDMA-based wireless transceiver with a modulator/demodulator configured to transmit and receive/interpret radio signals. Internet communications circuitry 113 can enable mobile telephone 110 to connect to Internet 108 using any of a variety of protocols, such as Wi-Fi or Bluetooth. Thus, a user of mobile telephone 110 can speak to any users connected via mobile network 104 and can speak to any other users connected via Internet 108.

Mobile telephone 110 can connect to mobile network 104 via cellular link 120 and to Internet 108 via Internet link 122. Cellular link 120 can, for example, be one or more radio signals transmitted by a base station included in mobile network 104. Internet link 122 may be any suitable type of wireless Internet interface, such as a Wi-Fi or Bluetooth interface. Because a wireless Internet connection may not be present in certain locations, Internet link 122 is shown in FIG. 1 as a dotted line. For example, if Internet link 122 is a Wi-Fi or Bluetooth link, Internet link 122 may not be present if mobile telephone 110 is brought outside of the range of the nearest Wi-Fi or Bluetooth router. Thus, Internet link 122 may represent a stable Internet connection. A stable Internet connection may refer to a connection to Internet 108 of sufficient signal strength (e.g., above a predetermined threshold) to maintain a telephone call.

To simplify the description of the invention, it will sometimes be assumed that cellular link 120 is constantly available, while Internet link 122 is not constantly available. This is merely illustrative. It should be understood that the embodiments of the invention can be extended to operate in scenarios where a cellular link is lost while an Internet connection is present (e.g., when a user enters a building that prevents cellular service, but includes Wi-Fi router connected to the Internet). For example, the technique employed by some of the embodiments for addressing a loss of Wi-Fi connection can instead be applied to address a loss of a cellular connection.

As shown in FIG. 1, PSTN 102 is connected to both mobile network 104 and VOIP service 106. Thus, a user connected to VOIP service 106 (e.g., via the user's desktop computer) can speak to another user connected to mobile network 104 (e.g., via the other user's mobile telephone) through PSTN 102. Because the telephony network is connected in this way, mobile telephone 110 can receive a telephone call via either cellular link 120 or Internet link 122 regardless of where the telephone call originated from. For example, mobile telephone 110 can receive telephone calls via cellular link 120 not only from other cellular telephones, but also from desktop computers connected to Internet 108. Likewise, mobile telephone 110 can receive telephone calls via Internet link 122 not only from other VOIP-enabled computer systems, but also from mobile telephones connected to mobile network 104. An example of this is illustrated in FIG. 2.

Figure 2:
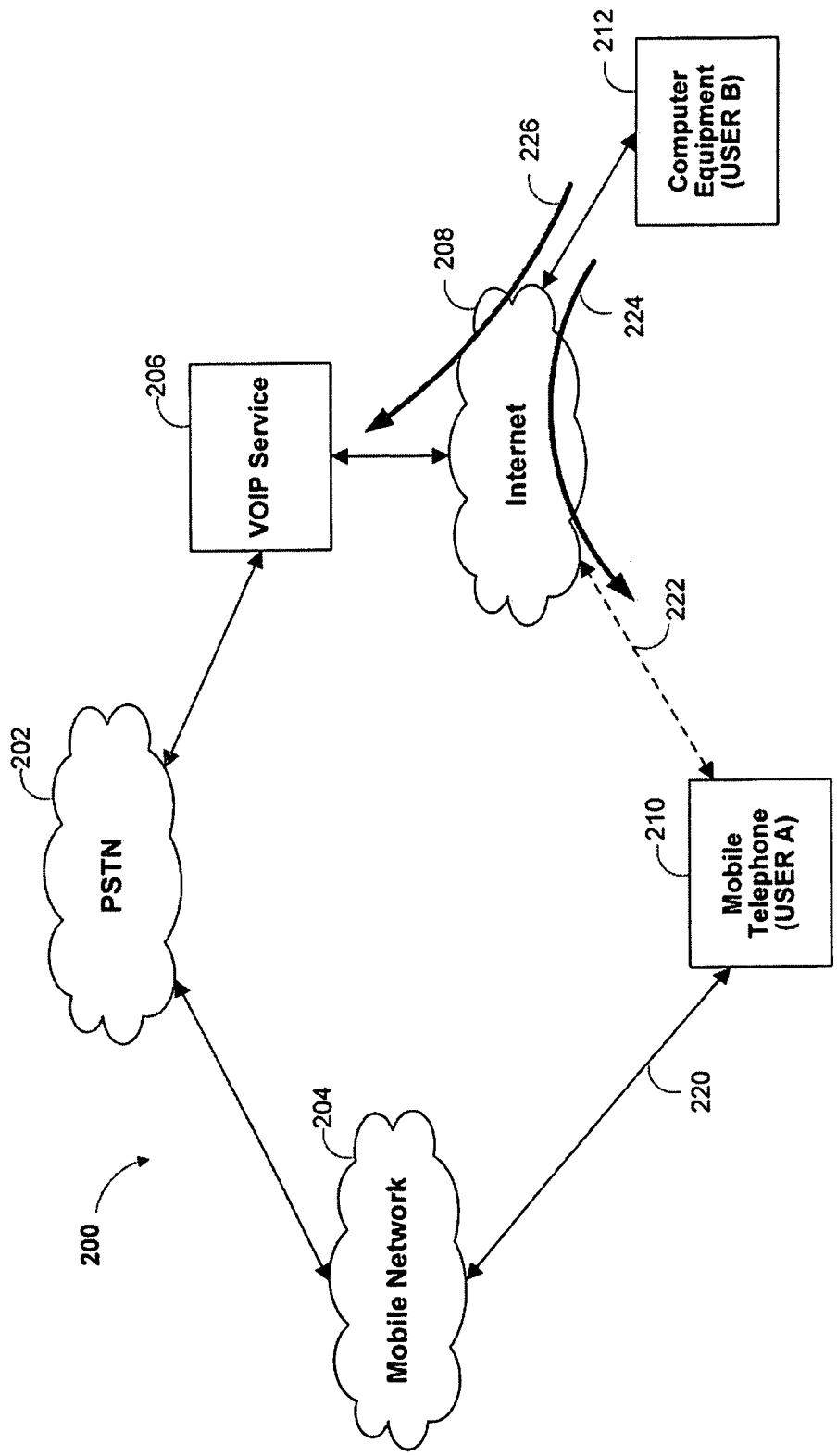
FIG. 2 shows a simplified block diagram of a telecommunications system with a mobile telephone and a computer system in accordance with an embodiment of the invention.

FIG. 2 shows a simplified block diagram of telecommunications system 200. Telecommunications system 200 can include several components that may have similar features or functionalities as those of corresponding components in system 100 (FIG. 1). For convenience, each component in system 200 that may correspond to another component in system 100 is similarly numbered, except that the first digit is "2" instead of "1." For example, mobile network 204 of FIG. 2 may or may not have similar features and functionalities as those described above for mobile network 104 of FIG. 1.

System 200 can additionally include computer equipment 212 that can connect to Internet 208, and therefore indirectly to PSTN 202 and mobile network 204. Computer equipment 212 can be, for example, a desktop computer connected to Internet 208 with an Ethernet cable or a laptop computer connected via Wi-Fi. FIG. 2 is intended to illustrate different ways for a telephone call to be routed and connected through the telephony network. Thus, in this figure, as well as in FIGS. 3-9 discussed below, telephone calls that are being made can be represented by arrows (e.g., arrows 224 and 226) through the telephony network that illustrate, for example, the services (e.g., mobile or VOIP) used to connect the telephone calls and the devices making or receiving the telephone calls. Similarly, telephone calls that are in progress may be represented by bold lines.

At some time, the user of computer equipment 212 ("User B") can make a telephone call to the user of mobile telephone 210 ("User A") using the VOIP technology provided by VOIP service 206. In one operating scenario, this telephone call can be connected to mobile telephone 210 through Internet 208 and Internet link 222. This operating scenario is illustrated in FIG. 2 by telephone call 224. In another operating scenario, mobile telephone 210 can receive the telephone call via mobile network 204 and cellular link 220. That is, the telephone call made from computer equipment 212 can be routed through Internet 208 into PSTN 202 via VOIP service 206, then routed through PSTN 202 to mobile network 204, and finally transmitted by mobile network 204 to mobile telephone 210 though cellular link 220. This second operating scenario is illustrated by telephone call 226. For simplicity, the two routes through system 200 to connect telephone call 226 and telephone call 224 can sometimes be referred to as "connection paths." That is, telephone call 224 may have a connection path including VOIP service 206, Internet 208, and Internet link 222. Telephone call 226 may have a connection path including Internet 208, VOIP service 206, PSTN 202, mobile network 204, and cellular link 220.

The connection path of telephone call 226 may be advantageous when Internet link 222 is not present. For example, this approach may be especially appropriate when mobile telephone 210 is not in range of a Wi-Fi router. Thus, by enabling both cellular and Internet calls, mobile telephone 210 can, among other things, (1) connect calls via Internet link 222 when this link is present, which limits the amount of mobile network usage needed by mobile telephone 210, and (2) receive telephone calls from a VOIP user (e.g., User B) through cellular link 220 even when Internet link 212 is not currently present.

Telecommunications system 200 can employ fixed mobile convergence ("FMC"). That is, while a telephone call is in progress between mobile telephone 210 and computer equipment 212, telecommunications system 200 can transfer the call from one connection path to another seamlessly. If telephone call 224 is in progress, the telephone connection between computer equipment 212 and mobile telephone 210 can at any time be switched to the connection path of telephone call 226. Similarly, if telephone call 226 is in progress, the connection path may at any time be switched to that of telephone call 224. For example, if mobile telephone 210 has a call connected to computer equipment 212 via Internet link 222, and somehow this connection is lost or starts to fade, the components of telecommunications system 200 can be configured to switch connection paths to the connection path with cellular link 220 in order for mobile telephone 210 to continue the current telephone call.

To enable fixed mobile convergence, VOIP service 206 may operate as a proxy or gateway between computer equipment 212 and mobile telephone 210. In this embodiment, telephone calls received from computer equipment 212 may be associated with a telephone number or address that VOIP service 206 assigns to computer equipment 212. VOIP service 206 can route the telephone calls to mobile telephone 210 between mobile network 204 and VOIP service 206. For example, VOIP service 206 can route telephone calls received from computer equipment 212 to mobile network 204 through PSTN 202, or can route the calls directly to mobile telephone 210 via Internet 208. An example of the operation of a telecommunications system with a VOIP service acting as a proxy will be described below in connection with FIGS. 3-5.

Figure 3:
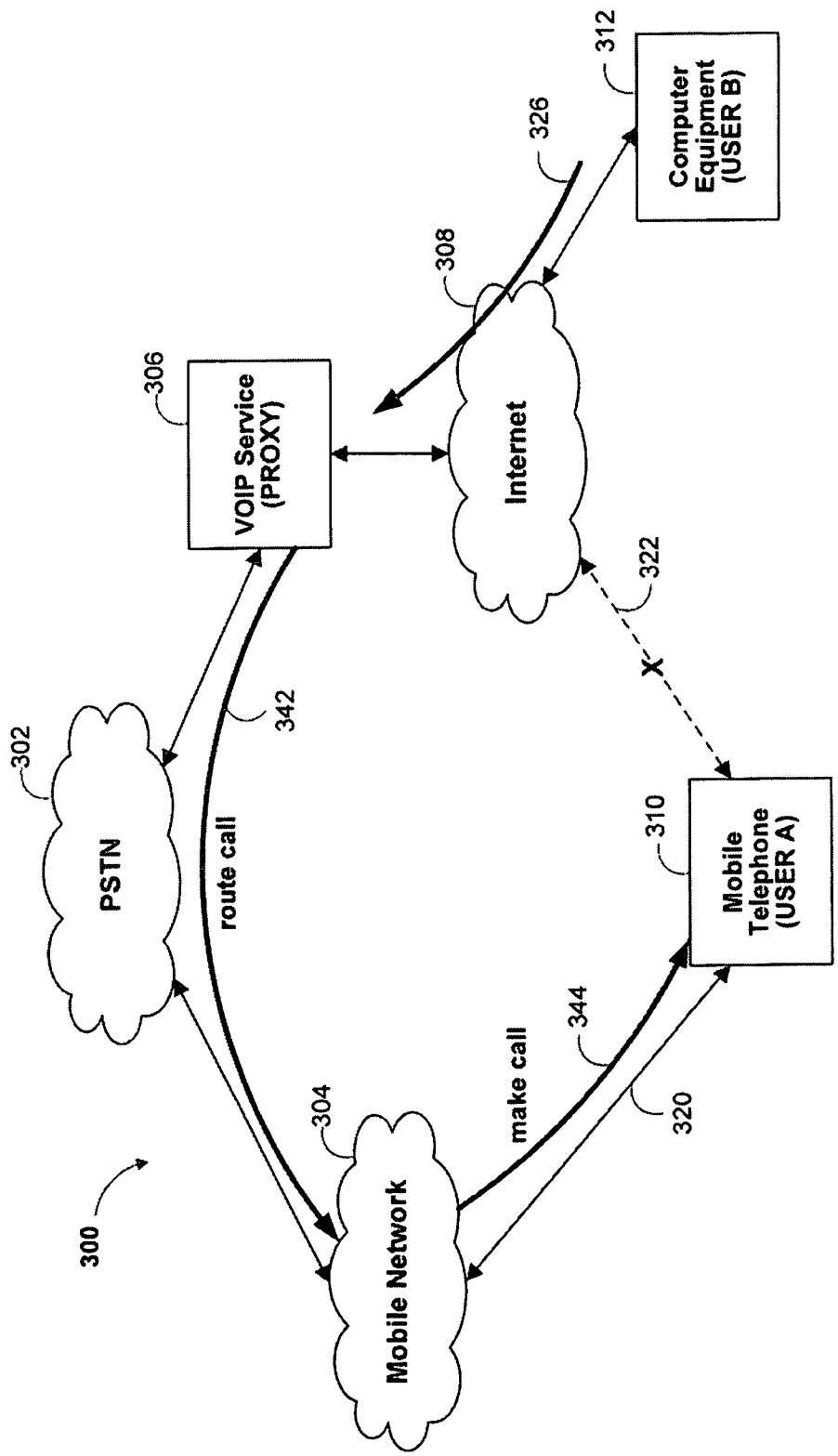
FIGS. 3-5 show simplified block diagrams of a telecommunications system with a VOIP service acting as a proxy in accordance with various embodiments of the invention.
Figure 4:
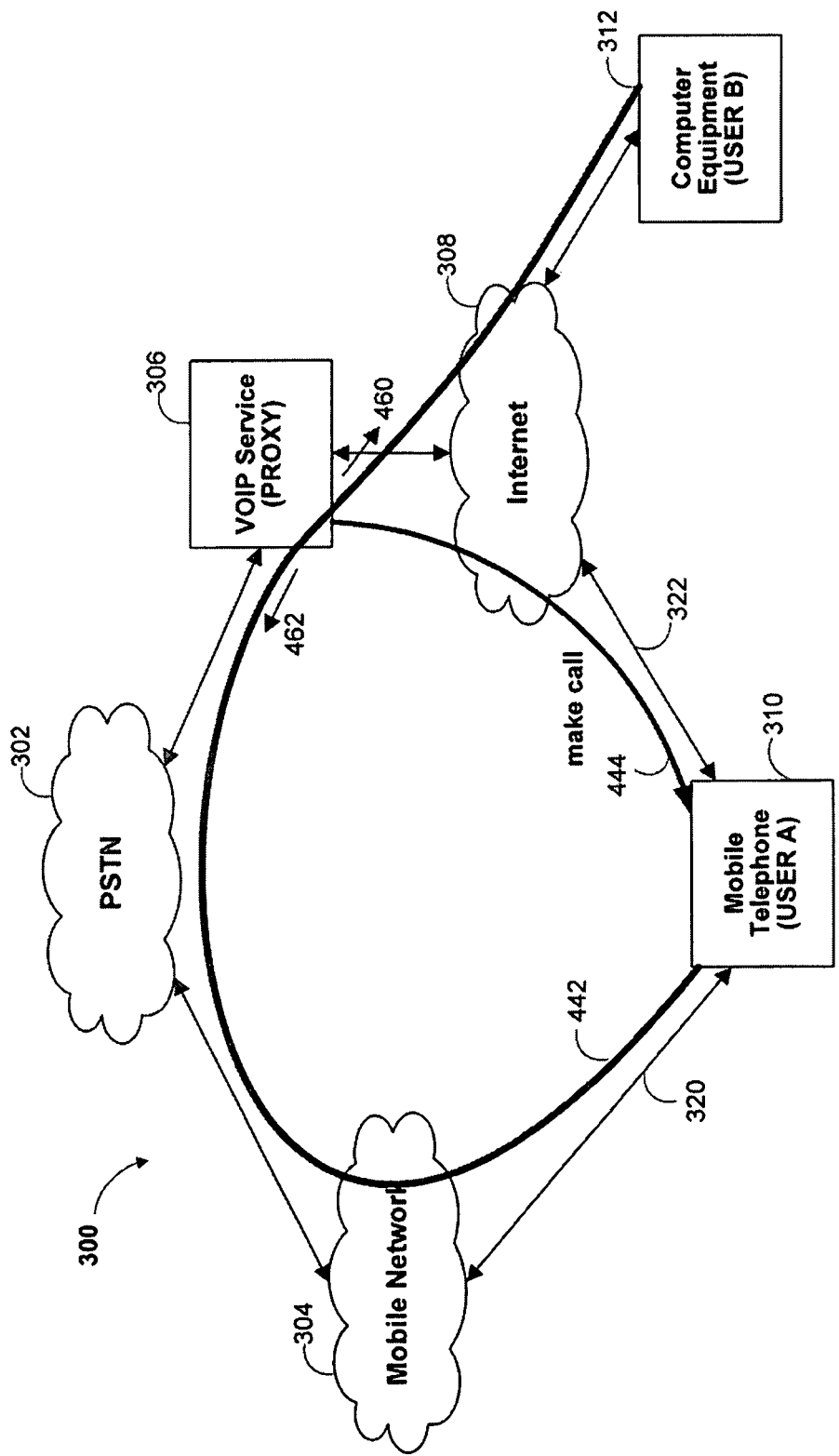
Figure 5:
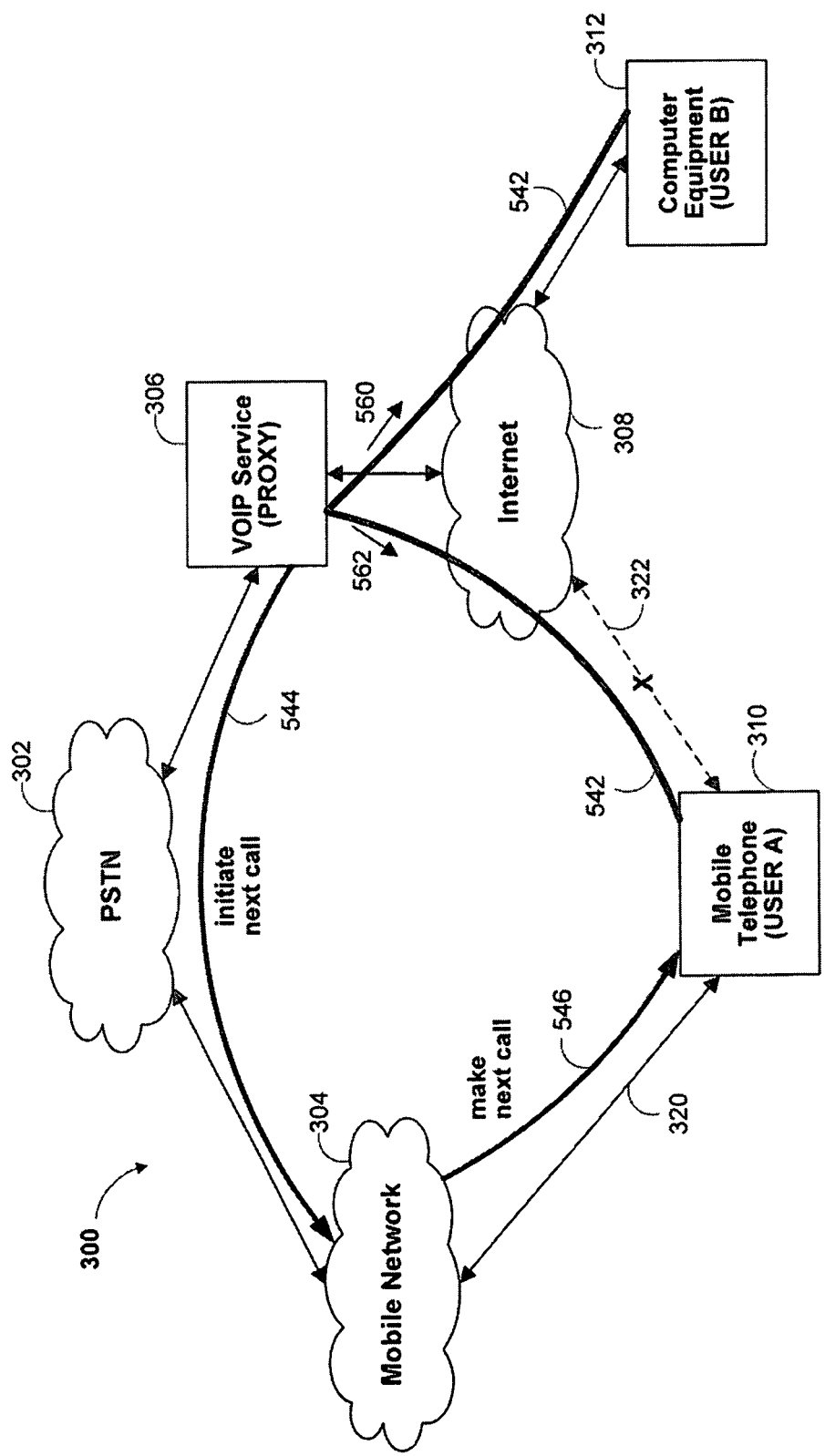

FIGS. 3-5 show a simplified block diagram of telecommunications system 300 that can include a VOIP service 306 that acts as the proxy for the telephony network. Telecommunications system 300 can include several components that may have similar features or functionalities as those of corresponding components in systems 100 and 200 (FIGS. 1 and 2), or may be components entirely different from the components in systems 100 and 200. For convenience, each component in system 300 that may correspond to another component in systems 100 and/or 200 is similarly numbered, except that the first digit is "3" instead of "1" or "2." For example, mobile network 304 of FIGS. 3-5 may or may not have similar features and functionalities as those described above for mobile network 104 of FIG. 1.

FIGS. 3-5 may illustrate the operation of telecommunications system 300 under changing operating conditions. In particular, FIG. 3 illustrates the operation of system 300 when a VOIP telephone call is received and Internet link 222 is not present, FIG. 4 illustrates the operation of system 300 when a stable connection develops on Internet link 322, and FIG. 5 illustrates the operation of system 300 when the stable connection on Internet link 322 fades or is lost. It should be understood, however, that these examples are merely illustrative, and should not be taken to limit the invention to the illustrated approaches.

Referring first to FIG. 3, telecommunications system 300 may be operable to connect telephone calls received from computer equipment 312 to mobile telephone 310 using either cellular link 320 or Internet link 322. Since computer equipment 312 is connected to the telephony network via Internet 308, a telephone call 326 may initially be received and registered by VOIP service 306. VOIP service 306 may determine which connection path to connect the telephone call based on whether Internet link 322 is present. That is, VOIP service 306 can select a connection path to mobile telephone 310 based on whether Internet link 322 is a stable Internet connection. At the time telephone call 326 is received, Internet link 322 may not be a stable Internet connection. For example, if Internet link 322 is a Wi-Fi link, mobile telephone 310 may not be in a location that includes a Wi-Fi router, or a Wi-Fi router may be too far away to allow for a reliable telephone connection via the Internet. Thus, VOIP service 106 can route telephone call 326 through the connection path with mobile network 304 and cellular link 320.

As the proxy, VOIP service 306 can route telephone call 326 received from computer equipment 312 to mobile network 304 through PSTN 302. Routed call 342 can be received by mobile network 302, which may interpret the routed telephone call as any standard telephone call. That is, in terms of network protocol, mobile network 302 may not be able to distinguish routed call 342 from, for example, a telephone call received from a fixed telephone connected to the telephony network via PSTN 302. When mobile network 304 receives telephone call 342, mobile network 304 can in turn transmit telephone call 344 to mobile telephone 310 through mobile network 304 and cellular link 320. For example, mobile network 304 may determine that routed call 342 is intended for mobile telephone 310, and can make call 344. User A can answer telephone call 344 to complete the connection between computer equipment 312 and mobile telephone 310.

At some subsequent point in time, a stable Internet connection may develop between mobile telephone 310 and Internet 308. For example, User A may bring mobile telephone 310 to a location where a Wi-Fi router is within range of mobile telephone 310. This operating condition is shown in FIG. 4. A telephone call 442 between computer equipment 312 and mobile telephone 310 may already be in progress through VOIP service 306 and mobile network 304. Telephone call 442 can be the call connected using the approach described above in connection with FIG. 3, or a call connected using a different approach. In some embodiments, VOIP service 306 can maintain telephone call 442 by bridging two call segments. The first call segment is represented by arrow 460, and may be connected from VOIP service 306 to computer equipment 312 through Internet 308. The second call segment is represented by arrow 462, and may be connected from VOIP service 306 to mobile telephone 310 through PSTN 302 and mobile network 304.

With continued reference to FIG. 4, when Internet link 322 develops, telephone call 442 can be transferred from the connection path that includes cellular link 320 to the connection path that includes Internet link 322. This may be desirable, because the connection path through Internet link 322 may not involve a cellular connection with mobile network 304. Instead, the connection path through Internet link 322 can involve only communication via Internet 308. As the service provider for mobile network 304 may charge User A for cellular usage based on the length of time that a call is connected via cellular link 320, it can be beneficial to User A for the telephone call that is in progress via cellular link 320 to be switched to VOIP service once Internet link 322 becomes available.

Accordingly, once Internet link 322 develops, mobile telephone 310 can detect this link, and can transmit a packet to VOIP service 306 via Internet link 322 and Internet 308 to inform VOIP service 306 of the presence of Internet link 322. Alternatively, VOIP service 306 can ping mobile telephone 310 through Internet 308 to determine whether Internet link 322 is present In response to determining that Internet link 322 is present, VOIP service 306 can make telephone call 444 to mobile telephone 310 using VOIP technology. That is, VOIP service 306 can transmit telephone call 444 as if a new call were requested by computer equipment 312. When mobile telephone 310 receives telephone call 444, mobile telephone 310 can detect that telephone call 444 originated from the same equipment, computer equipment 312, as telephone call 442 that is currently in progress. For example, telephone call 444 can include an embedded IP address of computer equipment 312, and mobile telephone 310 can identify that the IP address associated with the telephone call 444 is the same IP address as the IP address associated telephone call 442.

With continued reference to FIG. 4, when mobile telephone 310 determines that telephone call 444 is from the same caller as telephone call 442, mobile telephone 310 can automatically disconnect telephone call 442 and automatically connect telephone call 444 in a manner that is not disruptive to a conversation between User A and User B. For example, mobile telephone 310 may ensure telephone call 444 is connected before disconnecting telephone call 442 to ensure no interruption in telephone service. To maintain a connection between computer equipment 312 and mobile telephone 310, VOIP service 306 may disconnect only call segment 462 when mobile telephone 310 attempts to disconnect telephone call 442, and can bridge call segment 460 with telephone call 444. Using these or other approaches, the handover from mobile service to VOIP service illustrated in FIG. 4 may be performed seamlessly and automatically. That is, the switch may advantageously be performed by VOIP service 306 and mobile telephone 310 without user input or request, or possibly without even making the user aware of the switch.

Initially, the latency of the connection path associated with telephone call 442 and the connection path associated with telephone call 444 may be different. For example, the connection path of telephone call 444 includes fewer networks, and may therefore have a shorter latency of data transmission than the connection path of telephone call 442. If this latency difference is not considered when making a handover from one service to another, Users A and B may experience an audible noise from the sudden timing change. Thus, VOIP service 306 and/or mobile telephone 310 can identify the difference in latency between these two connection paths. For example, mobile telephone 310 may compare the audio signal received from cellular link 320 with the audio signal received from Internet link 322 to determine the time delay between the two signals. From the knowledge of the latency difference, VOIP service 306 or mobile telephone 310 may insert a delay into the connection path associated with, for example, telephone call 444. For instance, mobile telephone 310 may effectively change the delay by performing sample rate conversion on the signal received from VOIP service 306 to slow down or speed up telephone call 444 imperceptibly. This delay may allow the total latency of the connection path through Internet link 322 to substantially match the latency of the connection path through cellular link 320. Mobile telephone 310 may switch service to VOIP service 306 once the delay is appropriately established to allow for a seamless transition between services.

After some time, the connection strength of Internet link 322 may begin to fade or may be completely lost. For example, User A may move mobile telephone 310 away from a location that has a Wi-Fi router or another type of wireless router in range. This operating condition is shown in FIG. 5. In particular, FIG. 5 shows telecommunications system 300 in a scenario where a telephone call 542 is in progress via Internet 308 and Internet link 322, but where Internet link 322 may be fading or lost altogether. Telephone call 542 can include call segment 560 between VOIP service 360 and computer equipment 312 and call segment 562 between VOIP service 306 and mobile telephone 310. Telephone call 542 can represent the telephone connection of discussed above in connection with FIG. 4, or a telephone call connected using an entirely different approach.

With continued reference to FIG. 5, using any of the techniques discussed above (or any other technique), VOIP service 306 may be made aware of that Internet link 322 is no longer a stable Internet connection. For example, mobile telephone 310 can determine when the signal strength of Internet link 322 begins to fade or is lost by detecting when strength of Internet link 322 drops below a predetermined threshold. Mobile telephone 310 may also or alternatively detect that the throughput of the Internet connection is insufficient to maintain the call because the connection is overloaded. Thus, when this condition is detected, mobile telephone 310 can transmit a packet to VOIP service 306 via Internet 308, which functions as a request to hand over the telephone call to mobile network 304. Alternatively, VOIP service 306 may analyze the number of errors in voice transmissions from mobile telephone 310, and may determine that the stable Internet connection is lost when a predetermined proportion of the received voice transmissions have errors.

Once VOIP service 306 is made aware of the decrease in strength of Internet link 322 (for example), VOIP service 306 can initiate telephone call 544 to mobile telephone 310 on behalf of computer equipment 312. VOIP service 306 can again act as a proxy, and can initiate telephone call 544 in much the same way as telephone call 342 discussed above in connection with FIG. 3. For example, VOIP service 306 can initiate telephone call 544 to mobile network 304 through PSTN 302 such that telephone call 544 appears to mobile network 304 as a typical telephone call received from PSTN 302. Thus, mobile network 304 can make telephone call 546 to mobile telephone 310 using cellular link 320.

With continued reference to FIG. 5, mobile telephone 310 can detect that telephone call 546 received from mobile network 304 is from VOIP service 306 and is associated with the same remote caller as telephone call 544 currently in progress or recently lost (that is, User B). When telephone call 546 is received, mobile telephone 310 can connect telephone call 546 as described above. At this point, the connection with Internet link 322 can be ended, and the telephone connection between mobile telephone 310 and computer equipment 312 can exist through cellular link 320 and mobile network 304. For example, VOIP service 306 may disconnect call segment 562, and can bridge telephones call 544 and 546 with call segment 560 to maintain the connection. Because mobile network 304 and cellular link 320 are again used to connect the call, User A can again be subject to the usage charge imposed by the service provider of mobile network 304.

However, as Internet link 322 may no longer be suitable to support a telephone call, this approach allows User A and User B to continue their telephone call with little to no interruption in service.

As described above in the example illustrated by FIGS. 3-5, the FMC capability of telecommunications system 300 may be embodied by VOIP service 306 and mobile telephone 310. That is, the operations that may be necessary to enable seamless routing of telephone calls can be performed solely by VOIP service 306 and mobile telephone 310, while mobile network 304 may use only conventional services. Thus, using the approach provided by this and other embodiments of the invention, FMC can advantageously be implemented without requiring major network changes on existing mobile networks, and can be implemented with different mobile networks that are based on different protocols.

In some embodiments of the invention, rather than having the VOIP service act as a proxy for a telephony network, the mobile network may act as the proxy between a remote caller and a mobile telephone. In this scenario, telephone calls received from a remote party may be advantageously associated with the telephone number the mobile network has assigned to the remote party. A mobile network acting as proxy may be operable to route telephone calls to the VOIP service through the PSTN, or can route the telephone calls directly to the mobile telephone via a cellular link. These and other features and functionalities described in connection with FIGS. 6-9.

FIGS. 6-9 show a simplified block diagram of telecommunications system 600 that can include a mobile network 604 that acts as the proxy between communications devices. Telecommunications system 600 can include several components that may have similar features or functionalities as those of corresponding components in systems 100, 200, and 300 (FIGS. 1-6), or may be components entirely different from the components in systems 100, 200, and 300. For convenience, each component in system 600 that may correspond to another component in these systems is similarly numbered, except that the first digit is "6" instead of "1," "2," or "3." For example, mobile network 604 of FIGS. 6-8 may have similar features and functionalities as those described above for mobile network 104 of FIG. 1, mobile network 204 of FIG. 2, and/or mobile network 304 of FIGS. 3-5. In addition, telecommunications system 600 may include mobile telephone 614, which may be operated by a user who is sometimes referred to as "User C."

Figure 6:
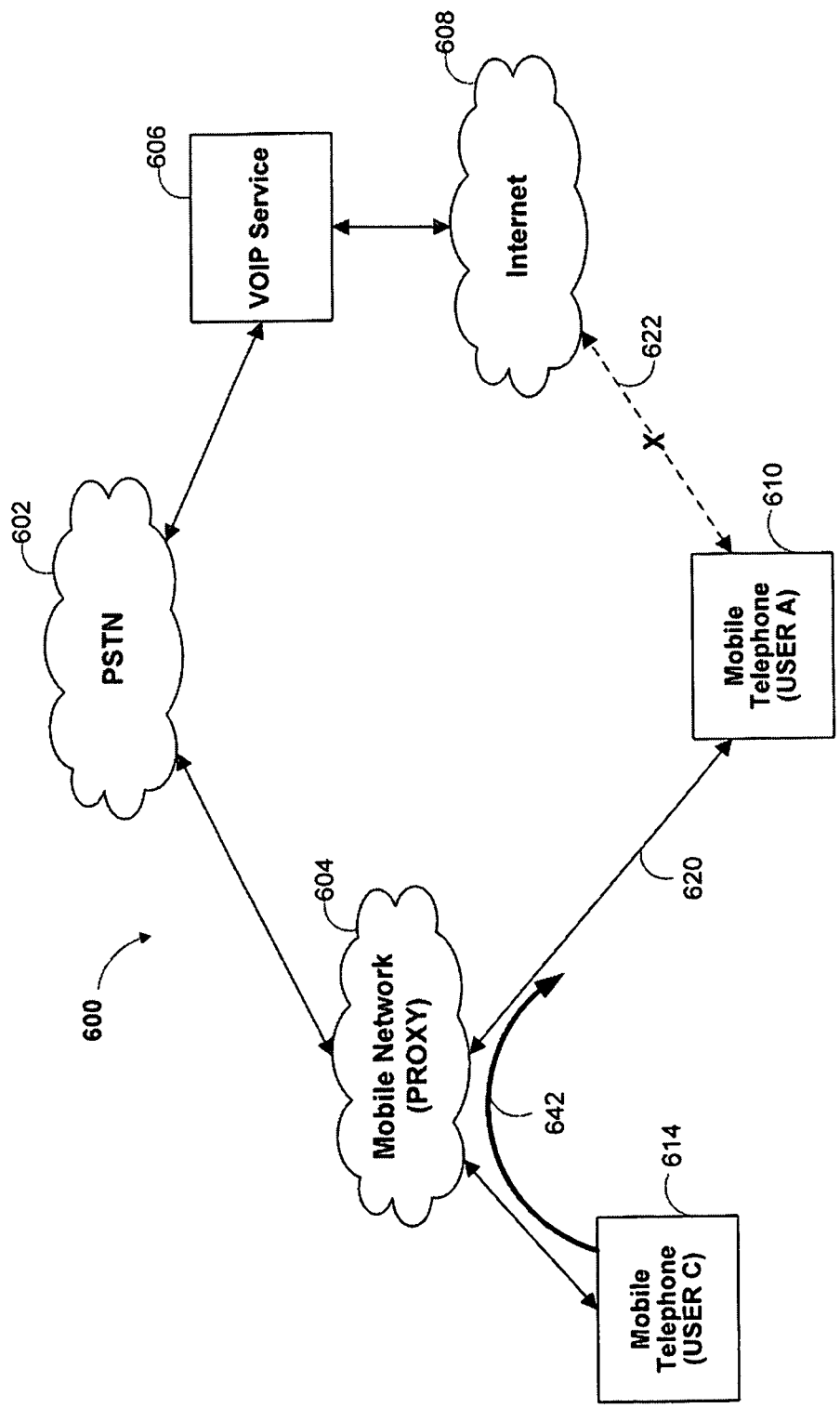
FIGS. 6-9 show simplified block diagrams of a telecommunications system with a mobile network acting as a proxy in accordance with various embodiments of the invention.
Figure 7:
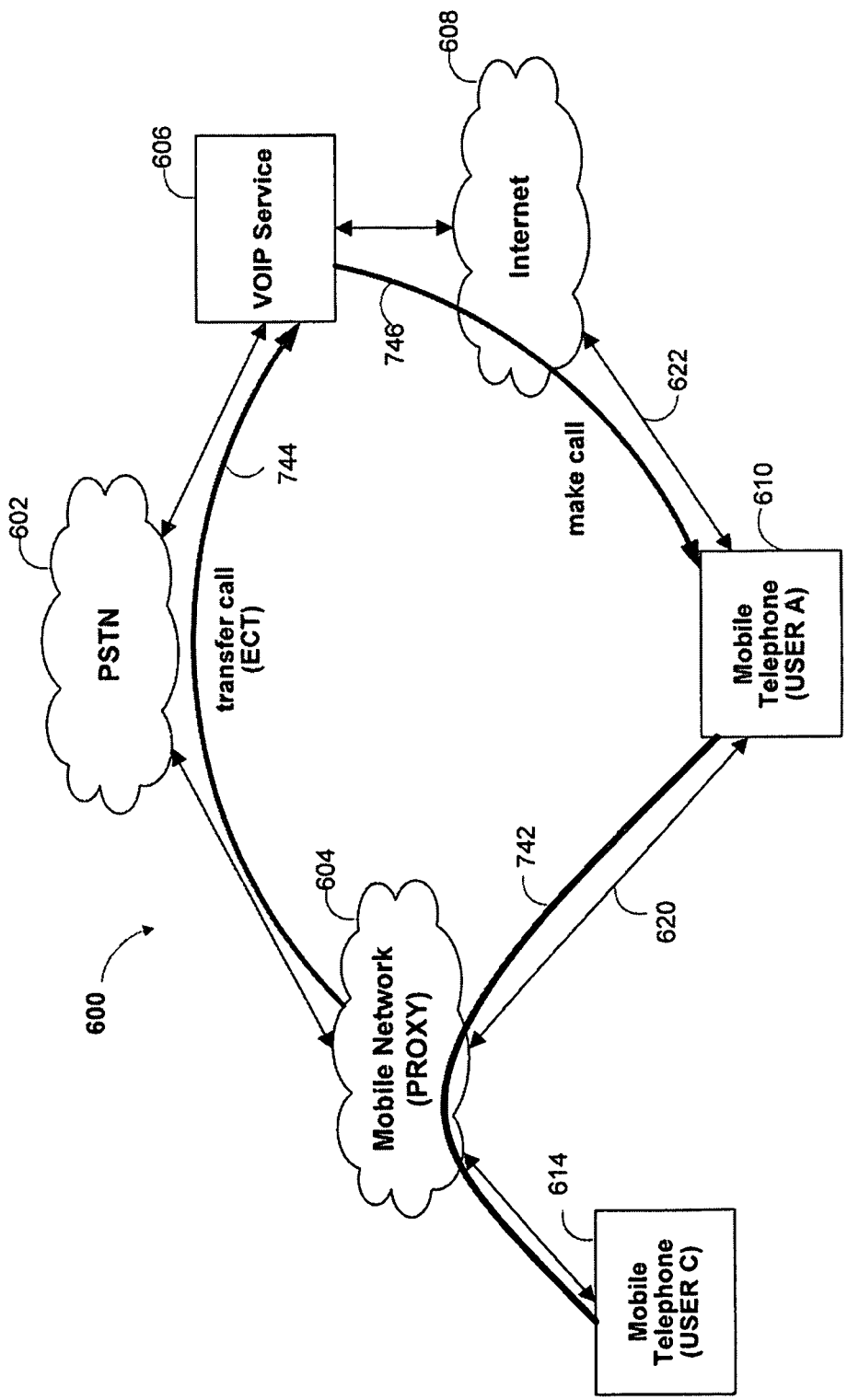
Figure 8:
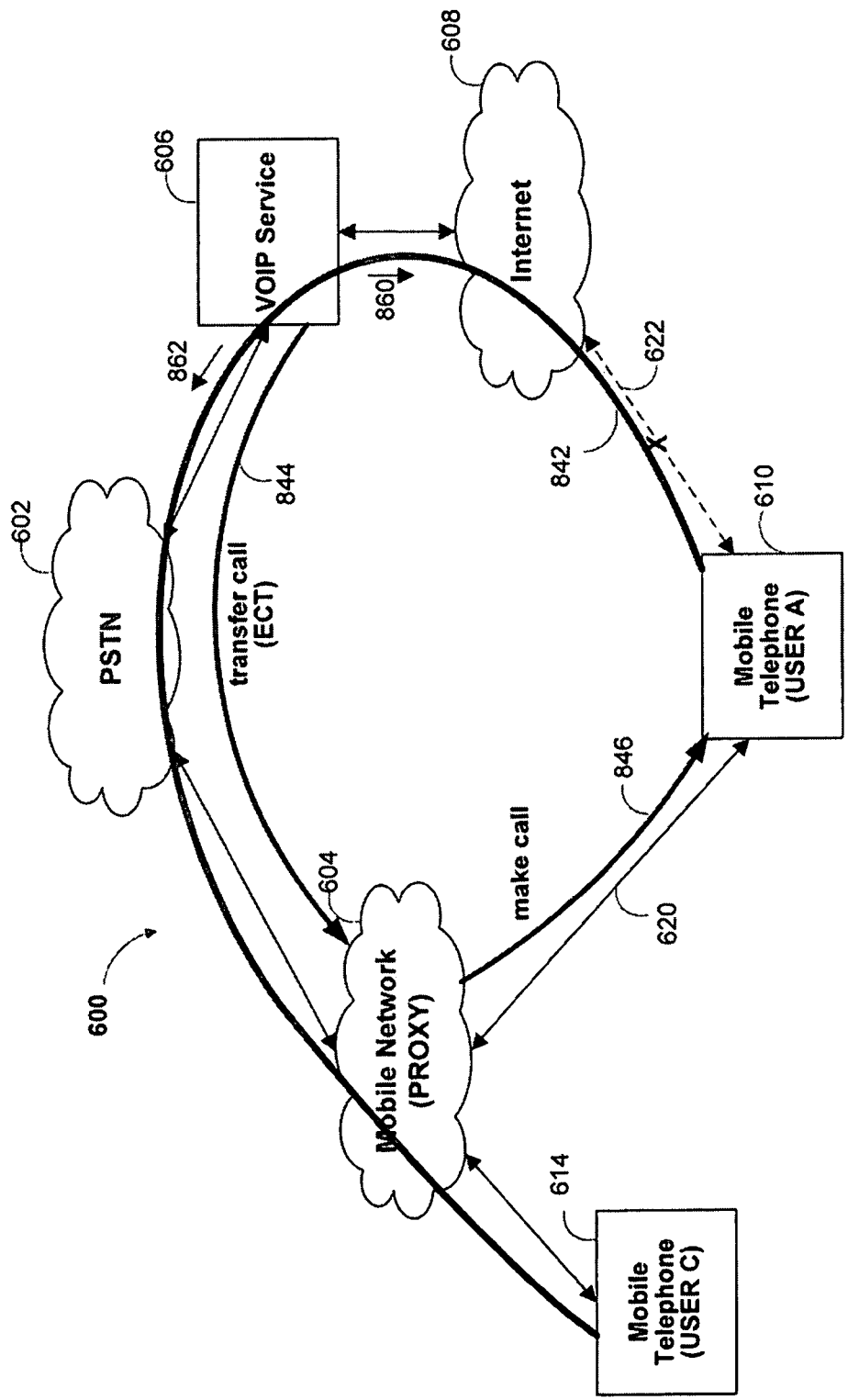

FIGS. 6-8 illustrate the operation of telecommunications system 600 under changing operating conditions. In particular, FIG. 6 illustrates the operation of system 600 when connecting a telephone call via cellular link 620 at a time when Internet link 622 is not stable or present, FIG. 7 illustrates the operation of system 600 when a stable connection develops on Internet link 622, and FIG. 8 illustrates the operation of system 600 when the connection on Internet link 622 fades or is lost. It should be understood, however, that these examples are merely illustrative, and should not be taken to limit the invention to the illustrated approaches.

Referring first to FIG. 6, when User C of mobile telephone 614 attempts to contact mobile telephone 610, mobile network 604 can initially receive telephone call 642. Upon receipt of telephone call 642 intended for mobile telephone 610, mobile network 604 can determine that mobile telephone 610 is registered on the cellular network and can alert mobile telephone 610 of incoming call 642. Telephone call 642 may then be connected by mobile telephone 610 upon User A's request.

Initially, a stable Internet connection may not exist on Internet link 622. Thus, telephone call 642 may be maintained until, at some subsequent point in time, Internet link 622 becomes present. The operating condition at this subsequent point in time is shown in FIG. 7. Telephone call 742 between mobile telephone 610 and mobile telephone 614 may already be in progress. This telephone call can be the call connected using the approach described above in connection with FIG. 6, or a telephone call connected using a different technique. When Internet link 622 develops, telephone call 742 can be switched from cellular service to VOIP service. The switch may be desirable, because the connection path through Internet link 622 may not involve cellular link 620 and mobile network 604, and therefore prevents User A from being charged by the service provider of mobile network 604.

With continued reference to FIG. 7, once a stable connection develops on Internet link 622, mobile telephone 610 can detect this link, and can transmit a packet to VOIP service 606 through Internet 608 to inform VOIP service 606 of the presence of a stable Internet connection on Internet link 622. In response to determining that the stable Internet connection has developed, mobile telephone 610 can use the ECT feature of PSTN 602 to transfer telephone call 742 to VOIP service 606. When VOIP service 606 receives transferred call 744, VOIP service 606 can set up VOIP call 746 to the mobile telephone 610. Once mobile telephone 610 receives telephone call 746 and determines that telephone call 746 is from the same caller as the telephone call 742, mobile telephone 610 can seamless switch from telephone call 742 to telephone call 746 using any of the techniques described above. Mobile telephone 610 may be able to determine the identity of the remote party associated with telephone call 746, since the ECT protocol employed to forward telephone call 742 can advantageously include a caller ID feature.

After some time, the connection strength of Internet link 622 may begin to fade or may be completely lost. For example, User A may move mobile telephone 610 away from a location that has a Wi-Fi router or another type of wireless router in range. This operating condition is shown in FIG. 8. In particular, FIG. 8 shows telecommunications system 600 in a scenario where a telephone call 842 is in progress through mobile network 604, PSTN 602, VOIP service 606, Internet 608 and Internet link 622, but where Internet link 622 may be fading or lost altogether. Telephone call 842 that is in progress can include call segments 860 and 862, and may be represent telephone calls 744 and 746 discussed above in connection with FIG. 7, or a telephone call connected using an entirely different approach. Using any of the techniques described previously, VOIP service 606 can determine that Internet link 622 is no longer a stable Internet connection.

Figure 9:
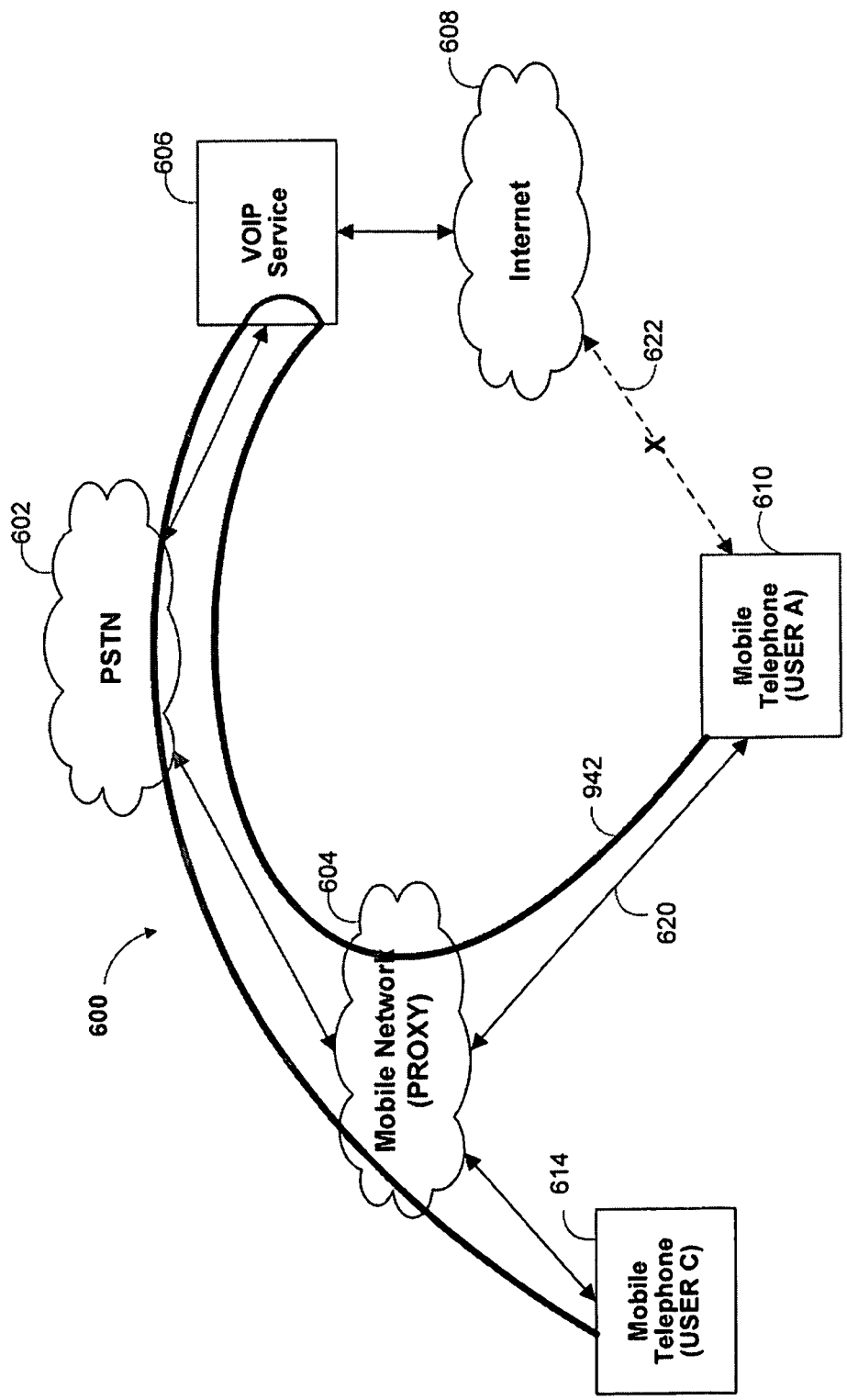

When VOIP service 606 determines that the strength of Internet link 622 has faded (e.g., from a service handover request received from mobile telephone 610), VOIP service 606 can initiate the transfer of telephone call 842 to cellular service. VOIP service 606 can, for example, make telephone call 844 to mobile telephone 610 through mobile network 604 on behalf of mobile telephone 614. In particular, to transfer telephone call 842, VOIP service 606 can transfer telephone call 842 to mobile network 604 using, for example, the ECT mechanism, via telephone call 844. Upon receiving transferred call 844, mobile network 604 may make telephone call 846 to mobile network 610. In response to receiving telephone call 846, mobile telephone 610 can identify that the telephone number of the telephone call 846 is the same as the telephone number associated with telephone call 842 that is in progress (e.g., using the caller ID feature included in the ECT protocol). Thus, mobile telephone 610 can determine that incoming call 846 and connected call 842 are from the same user, and can seamlessly switch from connected call 842 to incoming call 846 using the techniques described above. To maintain a connection between mobile telephone 614 and mobile telephone 610, VOIP service 606 may disconnect only call segment 860 connected through Internet 608, and can bridge call segment 862 with newly connected telephone calls 844 and 846. FIG. 9 shows the resulting connected telephone call that results from the handover from VOIP to cellular service.

FIGS. 3-9 illustrate telecommunications systems that can employ fixed mobile convergence. It should be understood that these figures and their corresponding descriptions are merely illustrative. The invention is not limited to these particular system configurations, nor is the invention limited to the operating responses discussed in connection with FIGS. 3-9. In particular, while the example of FIGS. 3-5 illustrates a VOIP service acting as a proxy for a telephone call from a computer system, and the second example illustrates a mobile network acting as a proxy for a telephone call from a mobile telephone, the invention is not limited to these particular configurations. For example, the VOIP service can be a proxy for calls received from any type of telephone system (e.g., a mobile telephone, a fixed telephone, or a computer system), and the mobile network can be a proxy for call received from any type of telephone system (e.g., a mobile telephone, a fixed telephone, or a computer system).

While the operating scenarios described in connection with FIGS. 3-8 refer to telephone calls received by mobile telephones 310 and 610, it should be understood that the illustrated techniques for handing over a call from one service to another service also apply to telephone calls initiated by mobile telephones 310 and 610. For example, connected calls 442, 542, 742, or 842 of FIGS. 4, 5, 7, and 8, respectively, may have been requested by mobile telephones 310 or 610 rather than by a remote party.

Moreover, FIGS. 3-9 are described above for embodiments where a service handover takes place by a VOIP service initiating a new telephone call to a mobile telephone on behalf of a remote caller, and the mobile telephone switching to the new call. However, this is only one possible approach to achieve a seamless service handover. In other embodiments, rather than the mobile telephone receiving and automatically connecting a telephone call from the VOIP service, the mobile telephone may initiate the new telephone call to the VOIP service. For example, the mobile telephone may initiate a telephone call intended for the remote caller to the VOIP service while another telephone call is in progress, and the VOIP service may switch from the connected call to the new call once the VOIP service determines that the two calls are between the same callers. This approach is described in greater detail below in connection with FIGS. 10 and 11.

FIGS. 3-9 illustrate a scenario where a mobile telephone is configured to switch between using a VOIP service and a mobile service. In some embodiments, the remote party connected to the mobile telephone (e.g., mobile telephone 614 of FIGS. 6-9) may have both cellular and Internet capabilities, and may also be configured to switch seamlessly between services. For telephone calls that involve more than two devices, or multi-party calls, any of the communications devices involved in the telephone connection may perform seamless switching between VOIP and cellular calls. Therefore, it should be understood that the techniques described in any of the embodiments of the invention are not limited to a single telephone call or a single communications device involved in a telephone connection.

Referring now to FIGS. 10-14, illustrative flow diagrams of various processes are shown that can be executed by some components of a telecommunications system (e.g., telecommunications systems 100, 200, 300, and 600 of FIGS. 1-9). It should be understood that the steps in these flow diagrams are merely illustrative, and that any illustrated steps can be removed, modified, or combined, and any new steps can be added to these processes, without departing from the scope of the invention.

Figure 10:
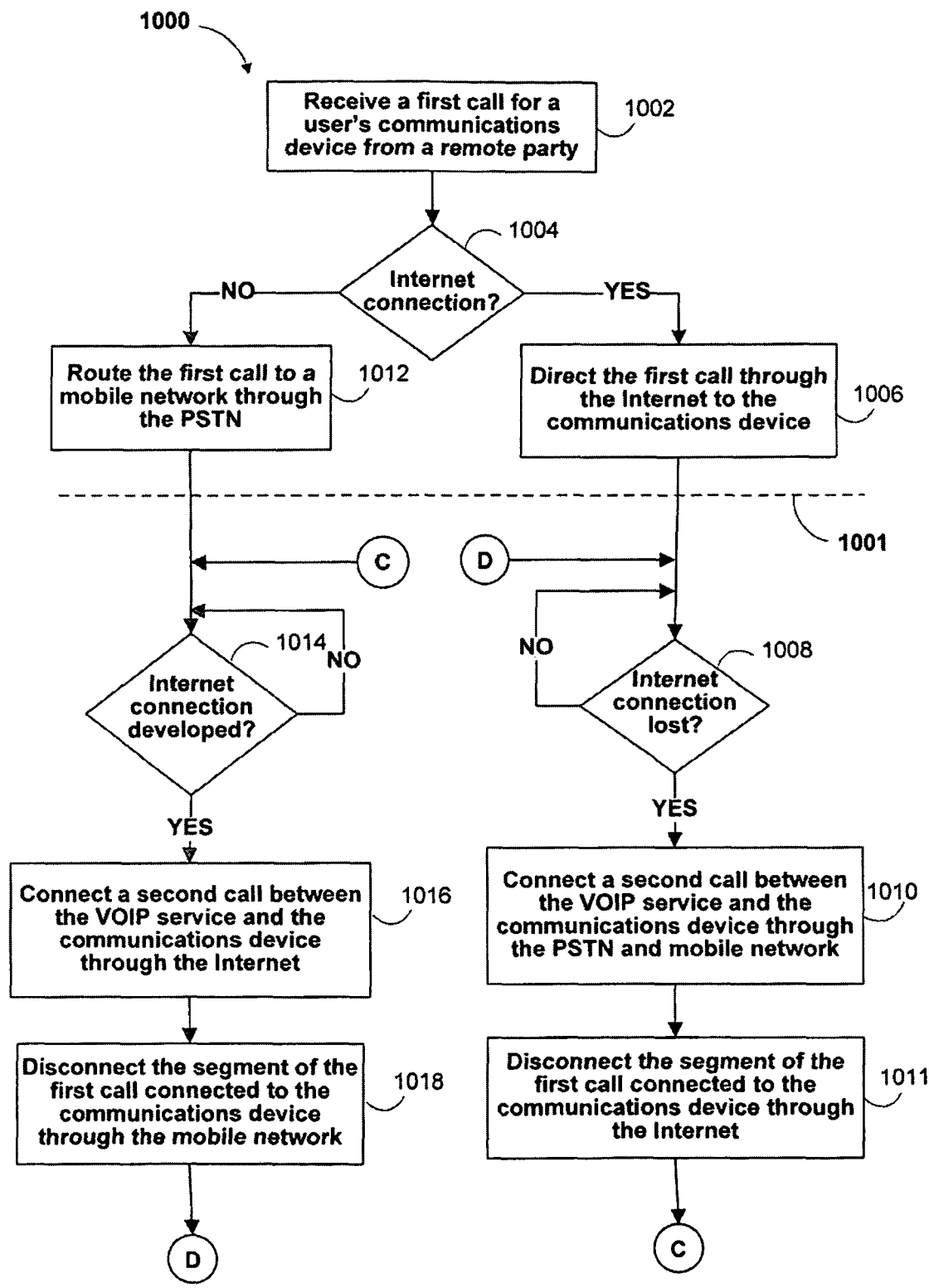
FIG. 10 shows a flow diagram of an illustrative process for routing calls between a mobile network and a VOIP service, where the VOIP service acts as a proxy, in accordance with an embodiment of the invention.

FIG. 10 shows an illustrative flow diagram of process 1000 for employing fixed mobile convergence in accordance with an embodiment of the invention. Process 1000 can be executed by a VOIP service (e.g., VOIP service 306 of FIGS. 3-5) that is capable of acting as a proxy between a communications device (e.g., a mobile telephone such as mobile telephones 110, 210, 310, and 610 of FIGS. 1-9) and a remote party. The steps of process 1000 may be divided into two parts, as separated by dotted line 1001. The steps of process 1000 shown above dotted line 1001 correspond to steps that the VOIP service may perform to initially connect a first telephone call to the communications device. The steps shown below dotted line 1001 correspond to steps that the VOIP service may perform to transparently switch a connected telephone call between mobile and VOIP services.

At step 1002, the VOIP service can receive a first telephone call for a user's communications device from a remote party. At step 1004, the VOIP service can determine whether the user's communications device has a stable Internet connection. If the VOIP service determines that the user's communications device has a stable connection, process 1000 can move to step 1006, where the VOIP service can direct the first telephone call through the Internet to the user's communications device. Once the call is connected, process 1000 can continue to step 1008. At step 1008, the VOIP service can determine whether the user's communications device has lost its stable Internet connection. If an Internet connection has not been lost or has not faded, the first call using VOIP technology can continue while the VOIP service repeatedly or periodically determines whether the Internet connection is lost or faded. If, at step 1008, the VOIP service determines that the first user's communications device has lost its stable Internet connection, process 1000 can move to step 1010.

At step 1010, VOIP service can connect a second call between the VOIP service and the communications device through the PSTN and mobile network. For example, the VOIP service can initiate the second call to the communications device through the PSTN and mobile network on behalf of the remote party, or the VOIP service can receive and connect a second call intended for the remote party from the communications device. At step 1011, the VOIP service can disconnect the segment of the first call that is connected to the communications device through the Internet. Once the call segment is disconnected, the telephone connection between the communications device and the remote party may exist through the second call connected between the VOIP service and the communications device and through the remaining segment of the first call connected between the VOIP service and the remote party. Process 1000 may then continue at step 1014, which is described below.

Returning to step 1004, if the VOIP service instead determines that the user's communications device does not have a sufficiently strong Internet connection when the remote party requests the first telephone call, the VOIP service can route the first telephone call to the mobile network. The VOIP service can route the first call at step 1012 through the PSTN. This may allow the mobile network to call the user's communications device and may allow a telephone connection to develop between the communications device and the remote party. Process 1000 can then move to step 1014, where the VOIP service can determine whether a stable Internet connection has developed. If the first user's communications device has not developed a stable Internet connection, the telephone call between the first and second user can continue via the mobile network, and the VOIP service may wait for an Internet connection to develop before performing any further actions. Once the VOIP service determines that an Internet connection has developed, the VOIP service can connect a second call between the VOIP service and the communications device through the Internet at step 1016. For example, the VOIP service can initiate the second call to the communications device on behalf of the remote party, or the VOIP service can receive and connect a second call from the communications device. With the second call connected, at step 1018, the VOIP service can disconnect the segment of the first call connected to the communications through the mobile network. Thus, the VOIP service can maintain a telephone connection between the communications device and the remote party through the second telephone call connected between the VOIP service and the communications device and through the remaining segment of the first call connected between the VOIP service and the remote party. Note that this telephone connection allows the communications device to be advantageously connected to the remote party through the Internet rather than through a cellular link. At this point, process 1000 may move to step 1008 to determine when the stable Internet connection is lost.

Figure 11:
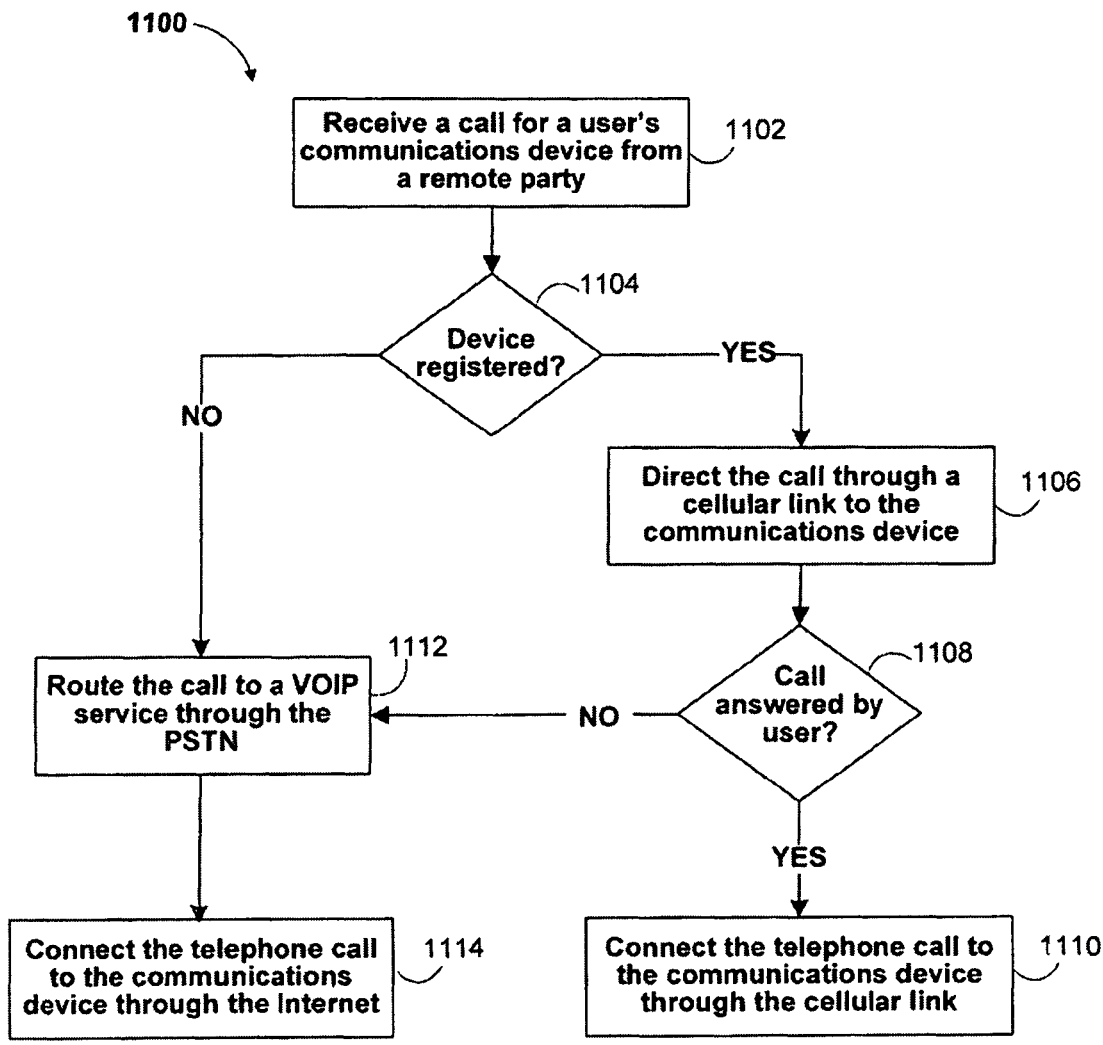
FIG. 11 shows a flow diagram of an illustrative process for receiving and connecting calls through a mobile network or a VOIP service, where the mobile network acts as a proxy, in accordance with an embodiment of the invention.

Referring now to FIG. 11, a flow diagram of illustrative process 1100 is shown for connecting a telephone call to a communications device using either a cellular or Internet connection. The steps of process 1100 may be performed by a mobile network (e.g., mobile network 604 of FIGS. 6-9) that can act as a proxy between the communications device and a remote party.

At step 1102, the mobile network can receive a telephone call from the remote party that is intended for the communications device. The call may be received from, for example, a cellular link when the remote party is a mobile telephone or from the PSTN when the remote party is a fixed telephone or computer system. At step 1104, the mobile network may determine whether the remote party is registered with the mobile network. If the mobile network determines that the remote party is registered, process 1100 may move to step 1106. At step 1106, the mobile network may direct the call through the mobile network and a cellular link to the communications device. Then, at step 1108, the mobile network may determine whether the telephone call has been answered by the user of the communications device. For example, the mobile network may determine whether the call has been answered within a predetermined period of time (e.g., 10 seconds). If the call is answered, the telephone call received from the remote party may be connected to the communications device at step 1110.

Returning to step 1104, the mobile network may determine that the communications device is not registered with the mobile network, or at step 1108, the mobile network may determine that the call has not been answered by the user of the communications device. In either case, process 1100 may move to step 1112. At step 1112, the mobile network may use a standard call forwarding feature to route the telephone call to a VOIP service through the PSTN. The mobile network may then connect the telephone call at step 1114 to the communications device through the VOIP service and an Internet connection.

Figure 12:
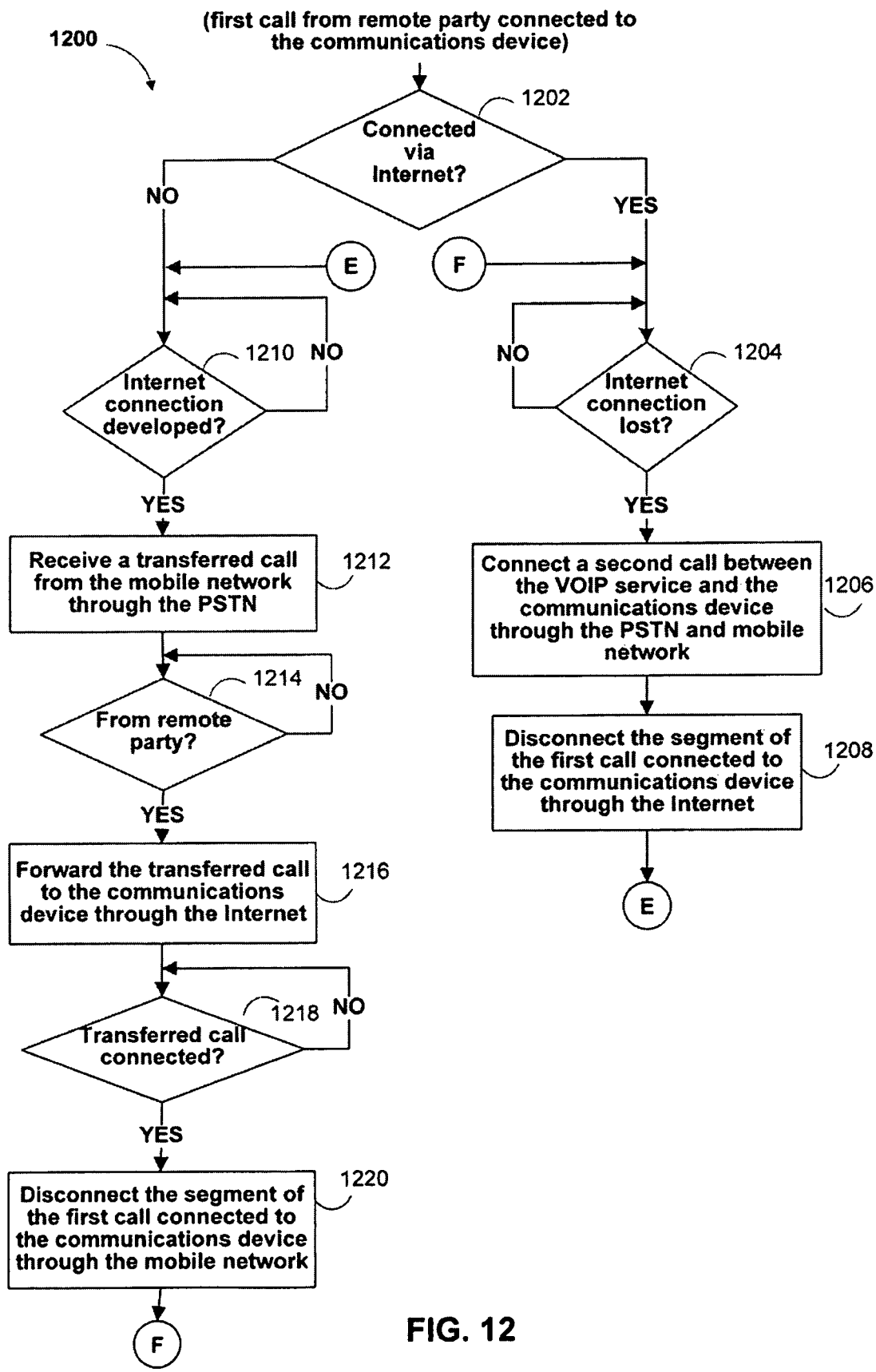
FIG. 12 shows a flow diagram of an illustrative process for routing calls between a mobile network and a VOIP service, where the mobile network acts as a proxy, in accordance with an embodiment of the invention.

FIG. 12 shows illustrative an flow diagram of process 1200 for employing fixed mobile convergence in accordance with another embodiment of the invention. Process 1200 can be executed by a VOIP service (e.g., VOIP service 606 of FIGS. 6-9) that may operate when a mobile network (e.g., mobile network 604 of FIGS. 6-9) is configured to act as a proxy between a communications device (e.g., a mobile telephone such as mobile telephones 110, 210, 310, and 610 of FIGS. 1-9) and a remote party. Because the mobile network acts as the proxy, the mobile network may initially connect a first telephone call between the communications device and the remote party, using, for example, the steps described above in connection with FIG. 11.

At step 1202, the VOIP service may determine whether the first call is connected to the communications device via the Internet. If so, process 1200 may move to step 1204, where the VOIP service can determine whether the communications device has lost its stable Internet connection. If, at step 1204, the VOIP service determines that the communications device has not lost its stable Internet connection, the VOIP service may periodically or repeatedly perform step 1204 until the VOIP service determines that the stable Internet connection has been lost. Once this occurs, process 1200 may move to step 1206, wherein the VOIP service can connect a second call between the VOIP service and the communications device through the PSTN and mobile network. For example, the VOIP service may initiate the second call to the communications device on behalf of the remote party through the mobile network, or the VOIP service can receive and connect the second telephone call from the communications device through the mobile network.

Once the second call is connected, process 1200 may move to step 1208. At step 1208, the VOIP service can disconnect the segment of the first call connected between the VOIP service and the communications device through the Internet. Thus, the VOIP service can maintain a telephone connection between the communications device and the remote party through the second call connected between the VOIP service and the communications device and through the remaining segment of the first call connected between the VOIP service and the remote party. In this way, a connection path may exist between the communications device and the remote party through a cellular connection to the mobile network, and without the Internet connection that has been lost or has faded. Process 1200 may then move to step 1210.

Step 1210 may be performed by the VOIP service when a telephone call from the remote party is connected to the communications device through a cellular connection (e.g., when the VOIP service determines that the communications device is not connected to the Internet at step 1202 or when service has been switched from the Internet to the cellular connection at steps 1206 and 1208). At step 1210, the VOIP service may determine if the communications device has developed a stable Internet connection. If not, the VOIP service can repeat step 1210 until a stable Internet connection develops and process 1200 can move to step 1212.

At step 1212, the VOIP service can receive a second telephone call from the mobile network through the PSTN. The second telephone call may or may not be a call transferred from the mobile network to the VOIP service using, for example, the ECT protocol. Thus, at step 1214, the VOIP service can determine whether the second telephone call is a forwarded call by determining whether the received call is from the remote party and intended for the communications device (e.g., using the caller ID information provided by the conventional ECT feature). If not, the VOIP service can wait for another call and can again determine at step 1214 whether the new call is a transferred call. If, at step 1214, the VOIP service determines that the second call is from the remote party, process 1200 can move to step 1216, and the VOIP service can forward the transferred call to the communications device through the Internet.

Then, at step 1218, the VOIP service can determine whether the transferred call has been connected by the communications device. If the VOIP service determines that the transferred call has not been connected, process 1210 can stall at step 1218 and the VOIP service can wait for the transferred call to be connected, or process 1210 may end. Once the transferred call is connected, process 1200 may continue to step 1220, where the VOIP service may disconnect the segment of the first call connected to the communications device through the Internet, leaving the communications device connected to the remote party through only the Internet. Process 1200 may then return to step 1204 to determine when the communications device's Internet connection is again lost.

Figure 13:
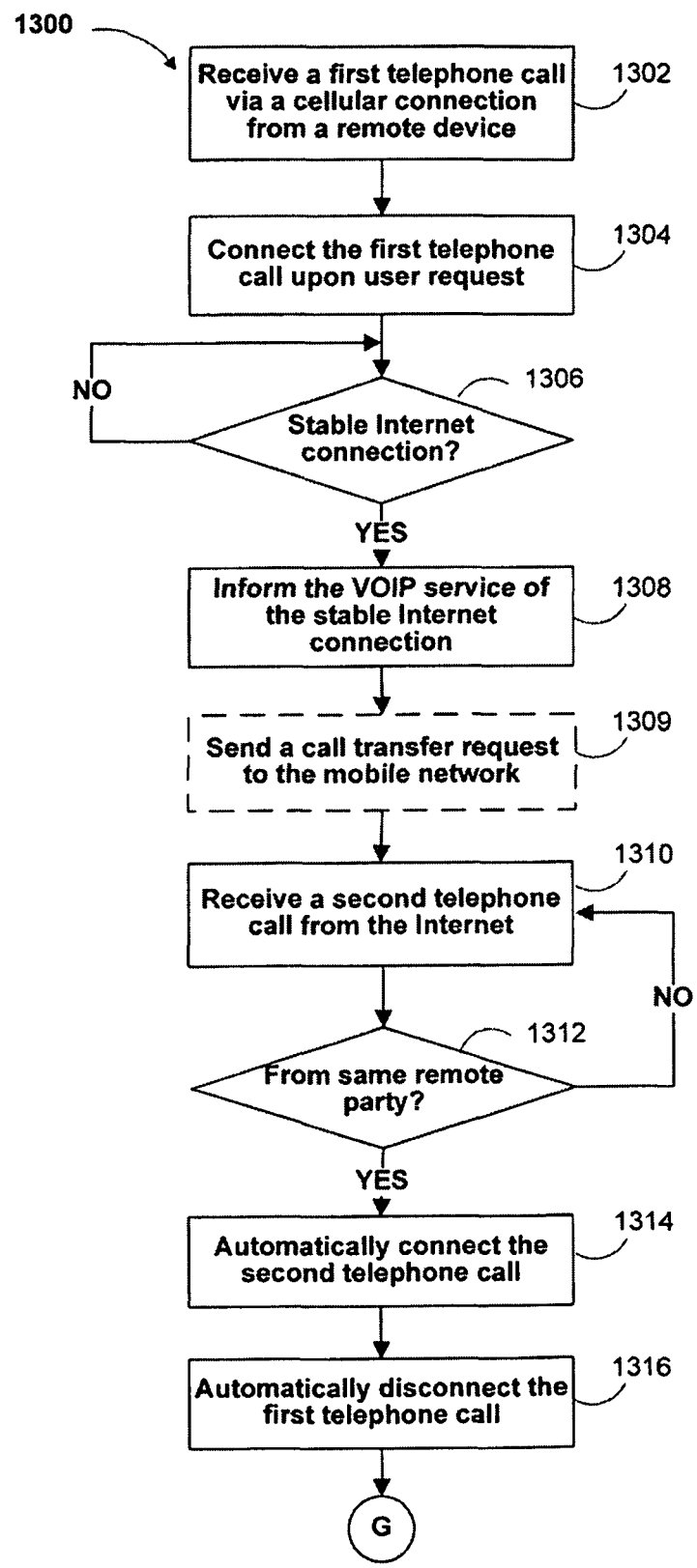
FIGS. 13 and 14 show flow diagrams of illustrative processes for switching telephone calls between through a mobile network and a VOIP service at a communications device in accordance with various embodiments of the invention.
Figure 14:
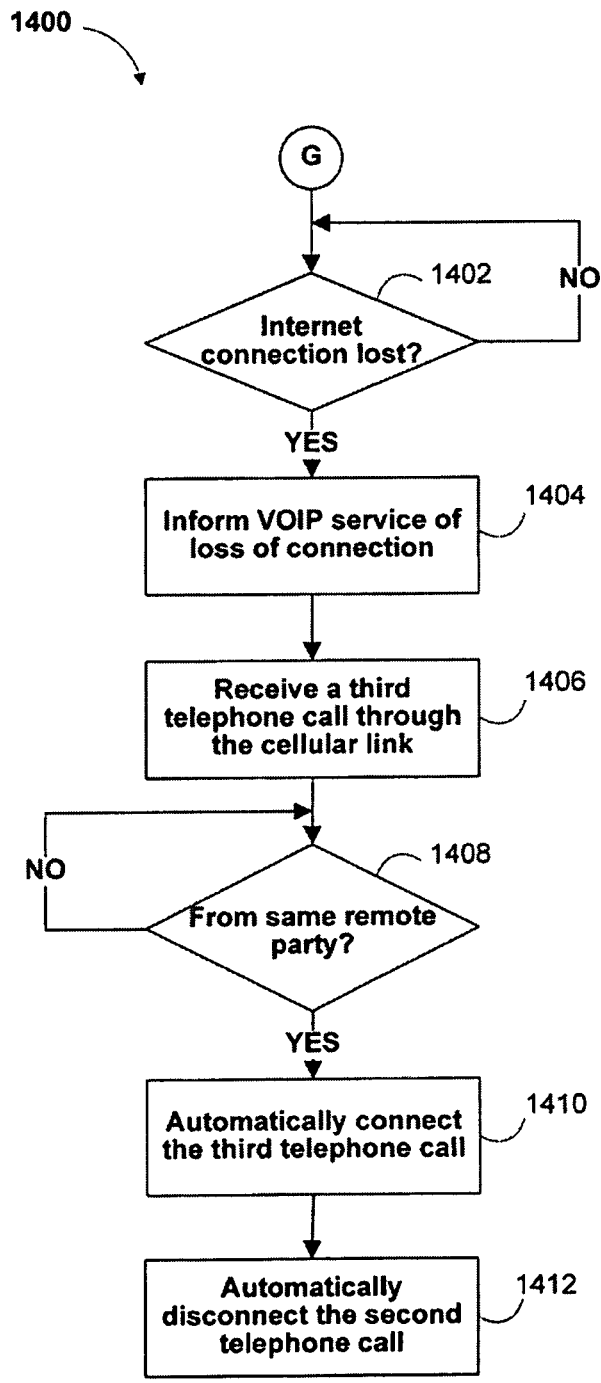

FIGS. 13-14 show illustrative flow diagrams of processes 1300 and 1400 for enabling a communications device to transparently switch telephone calls between mobile and VOIP services in accordance with an embodiment of the invention. Process 1300 can be executed by any suitable communications device (e.g., mobile telephones 110, 210, 310, and 610 of FIGS. 1-9) that has both Internet (e.g., Wi-Fi) and cellular capability. Some of the steps, for example, can be performed by processing circuitry of the communications device (e.g. cellular communications circuitry 111 of FIG. 1). At step 1302, the communications device can receive a first telephone call via a cellular link from a remote party (e.g., a mobile telephone, a fixed telephone, or a computer system). The telephone call may be received from a cellular link when, for example, the communications device is not currently connected to the Internet (e.g., via Wi-Fi) or when the telephone call from the remote party is initially received and registered by the mobile network.

At step 1304, the communications device can connect the first telephone call upon user request. Thus, after step 1304, the first telephone call may be in progress using the mobile network, and the user of the communications device may be charged for mobile network usage. At step 1306, the communications device can determine whether a stable Internet connection has developed. For example, the communications device can be configured to identify the strength of a Wi-Fi signal. The communications device can determine whether an Internet connection has developed in response to a status request, or the communications device can automatically and periodically detect for an Internet connection. If, at step 1306, the communications device determines that there is not an Internet connection of sufficient strength, the communications device can continue to search for a stable Internet connection. Once a stable Internet connection is detected at step 1306, process 1300 can move to step 1308.

At step 1308, the communications device can inform the VOIP service of a telephony network that an Internet connection exists. The communications device can inform the VOIP service of the presence of a stable Internet connection by transmitting a packet to the proxy or responding to a status request from the VOIP service, for example. The communications device may transmit the packet as part of a handshaking protocol between the communications device and the VOIP service that allows these components to collectively perform a seamless call handover from cellular to VOIP service.

After informing the VOIP service that an Internet connection exists, process 1300 may move to step 1309, where the communications device may send a call transfer request to the mobile network. The call transfer request may be a request for the mobile network to transfer the first telephone call to the VOIP service using the ECT mechanism, for example. In some embodiments, the communications device may only perform step 1309 when the mobile network acts as the proxy for the telecommunications system, and step 1309 may be bypassed when the VOIP service acts as the proxy. Thus, step 1309 is shown within dotted lines in FIG. 13 to indicate that step 1309 may not be needed.

At step 1310, the communications device can receive a second telephone call at step 1310. The second telephone call, unlike the first telephone call, can be received from the VOIP service. Then, at step 1312, the communications device can determine whether the second telephone call is from the same remote party as the first telephone call that is currently connected. For example, the communications device can detect that the second telephone call is associated with the same telephone number or the same IP address as the first telephone call, or the communications device can use any other suitable approach to identify and compare where the first and second originated from. If, at step 1312, the communications device determines that the second telephone call is not from the same user as the first telephone call, process 1300 can move back to step 1310. Thus, process 1300 may not progress to step 1314 until the communications device receives a telephone call that is from the same user as the first telephone call.

If, at step 1312, the communications device determines that the second telephone call is from the same user as the current telephone call, the second telephone call may correspond to the first call transferred from the mobile network using the ECT protocol, or the second telephone call may have been initiated by the VOIP service on behalf of the remote party. Process 1300 of FIG. 13 can then move to step 1314. At step 1314, the communications device may connect the second telephone call automatically and without informing the user of the new connection. Then, at step 1316, the communications device may disconnect the first telephone call connected via the cellular link such that a telephone connection with the remote party can remain through only the Internet connection.

Process 1300 can continue to step 1402, shown on FIG. 14. Although the steps shown in FIG. 14 can directly follow those in process 1300, for clarity, the steps in FIG. 14 may be referred to as part of process 1400.

Referring now to FIG. 14, at step 1402, the communications device can determine whether the stable Internet connection has been lost. The communications device can make this determination at step 1402 in response to a request by the VOIP service, or the communications device can automatically and periodically determine the strength of the Internet connection. If a stable Internet connection has not been lost, the communications device can remain at step 1402 with the second telephone call connected via the Internet connection, and the communications device can continue to determine whether the stable Internet connection has been lost. Once the communications device determines that the Internet connection has been lost or has significantly faded, process 1400 can move to step 1404. At step 1404, the communications device can inform the VOIP service that the stable Internet connection has been lost. For example, the communications device can transmit a packet to the VOIP service through the fading Internet connection indicating this change. The communications device can transmit this packet in response to a status request by the VOIP service or automatically.

Process 1400 can continue to step 1406. At step 1406, the communications device can receive a third telephone call from the mobile service, and at step 1408, the communications device can determine whether the third telephone call originated from the same user equipment as the second call currently in progress, e.g., the remote party. For example, the communications device can be configured to detect that the second telephone call is associated with the same telephone number or the same IP address as the current telephone call. If the third telephone call is not from the same user, process 1400 may remain at step 1408, and the communications device can continue to determine whether a newly received call is from the same user equipment as the currently connected second telephone call. If, at step 1408, the communications device instead determines that the third telephone call is from the remote party, the communications device can automatically connect the third telephone call using a cellular link at step 1410. Once connected, at step 1412, the communications device can automatically disconnect the second telephone call from the Internet connection to seamless switch the audio stream from the Internet link to the cellular link.

The foregoing describes systems and methods for routing telephone calls between mobile and VOIP services. Those skilled in the art will appreciate that the invention can be practiced by other than the described embodiments, which are presented for the purpose of illustration rather than of limitation, and the invention is limited only by the claims which follow.

What is claimed is:

1. A method of switching a voice call communication session for a communications device from a mobile service to a voice over Internet protocol (VoIP) service, wherein the communications device is in communication with a remote device during the voice call communication session, the method comprising:
   maintaining a first voice call communication between the communications device and the remote device, wherein the first voice call communication is established for the communications device via the mobile service;
   automatically establishing a second voice call communication between the communications device and the remote device via the VoIP service;
   automatically disconnecting at least one call segment of the first voice call communication between the mobile service and the communications device, wherein the first voice call communication has a first audio latency and the second voice call communication has a second audio latency;
   comparing the first audio latency to the second audio latency; and
   adding a delay to the second audio latency of the second voice call communication such that the second audio latency matches the first audio latency of the first voice call communication, based at least in part on the comparing,
   wherein the adding of the delay to the second audio latency of the second voice call communication is performed prior to the automatic disconnecting.

2. The method of claim 1, further comprising bridging at least one remaining call segment of the first voice call communication between the mobile service and the remote device with the established second voice call communication to maintain the voice call communication session for the communications device without interruption during the switching.

3. The method of claim 1, further comprising determining whether the communications device has a stable Internet connection,
   wherein the second voice call communication is automatically established in response to determining that the communications device has stable Internet connection.

4. The method of claim 1, wherein automatically establishing the second voice call communication further comprises transmitting communications of the second voice call communication via the VoIP service between the communications device and the remote device.

5. The method of claim 1, wherein automatically establishing the second voice call communication further comprises:
   sending a request from the communications device to the mobile service to switch the first voice call communication from the mobile service to the VoIP service;
   receiving a transfer of the first voice call communication at the VoIP service; and
   establishing the second voice call communication between the VoIP service and the communications device in response to receiving the transfer.

6. A method of switching a voice call communications session of a communications device from a voice over Internet protocol (VoIP) service to a mobile service, wherein the communications device is in communication with a remote device during the voice call communication session, the method comprising:
   maintaining a first voice call communication between the communications device and the remote device, wherein the first voice call communication is established for the communications device through via the VoIP service;
   establishing a second voice call communication between the communications device and the remote device via the mobile service and a public switched telephone network (PSTN) in response to receiving the second voice call communication at the communications device;
   automatically disconnecting at least one call segment of the first voice call communication between the VoIP service and the communications device, in response to determining that at least a portion of the VoIP service is not stable enough to support the first voice call communication or in response to determining that at least a portion of the VoIP service has been lost; and
   bridging at least one remaining call segment of the first voice call communication between the VoIP service and the remote device with the established second voice call communication to maintain the voice call communications session for the communications device without interruption during the switching,
   wherein, prior to establishing the second voice call communication, an audio latency associated with the second voice call communication is modified to match an audio latency associated with the first voice call communication.

7. The method of claim 6, further comprising determining whether the communications device has lost a stable Internet connection,
   wherein the second voice call communication is automatically established in response to determining that the communications device has lost stable Internet connection.

8. A method of switching a voice call communication between a first communications network that is associated with a mobile service and a second communications network that is associated with a voice over Internet protocol (VoIP) service at a mobile communications device, the method comprising:
   establishing a first voice call communication over the first communications network between the mobile communications device and remote device;

receiving a second voice call communication over the second communications network;
determining whether the second voice call communication is associated with the remote device; and
automatically switching from the first voice call communication to the second voice call communication in response to determining that the second voice call communication is from the remote device, such that a communications session between the communications device and the remote device is not interrupted during the switching,
wherein prior to the switching, modifying an audio latency associated with the second voice call communication such that the audio latency associated with the second voice call communication matches an audio latency associated with the first voice call communication, and
wherein the automatic switching from the first voice call communication to the second voice call communication occurs using an explicit call transfer (ECT) protocol.

9. The method of claim 8, wherein determining whether the second voice call communication is associated with the remote device further comprises comparing a telephone number of the second voice call communication to a telephone number of the first voice call communication.

10. The method of claim 8, wherein determining whether the second voice call communication is associated with the remote device further comprises comparing an Internet protocol (IP) address of the second voice call communication to an IP address of the first voice call communication.

11. A mobile communications device comprising:
at least one wireless communications transceiver and
one or more processors configured to execute computer program code to cause the mobile communications device to:
establish a first voice call communication via a mobile network between the mobile communications device and a remote device;
receive a second voice call communication via a voice over Internet protocol (VoIP) service;
determine whether the second voice call communication is associated with the remote device; and
automatically switch to the second voice call communication in response to determining that the second voice call communication is from the remote device, such that a communications session between the communications device and the remote device is not interrupted during the switch;
wherein, prior to the switch, the second voice call communication is modified such that an audio latency associated with the second voice call communication matches an audio latency associated with the first voice call communication.

12. The mobile communications device of claim 11, wherein the one or more processors are further configured to cause the mobile communications device to:
disconnect the first voice call communication after the second voice call communication has been established.

13. The mobile communications device of claim 11, wherein the at least one wireless communications transceiver comprises Wi-Fi transceiver that enables a Wi-Fi connection to the VoIP service,
and wherein the one or more processors are configured to execute computer program code to cause the mobile communications device to direct the at least one wireless communications transceiver to transmit status information to the VoIP service that indicates a strength of the Wi-Fi connection.

14. The mobile communications device of claim 11, wherein the one or more processors are configured to execute computer program code to cause the mobile communications device to determine whether the second voice call communication is associated with a same IP address or a same telephone number as the first voice call communication.

15. The mobile communications device of claim 11, wherein the second voice call communication is established automatically and without input from a user of the mobile communications device.

16. The mobile communications device of claim 11, wherein the at least one wireless communications transceiver is further configured to receive a third voice call communication via the mobile network,
and wherein the one or more processors are configured to execute computer program code to cause the mobile communications device to:
determine whether the third voice call communication is from the remote device; and
direct the at least one wireless communications transceiver to establish the third voice call communication in response to determining that the third voice call communication is from the remote device.

* * * * *

UNITED STATES PATENT AND TRADEMARK OFFICE
CERTIFICATE OF CORRECTION

PATENT NO. : 8,724,619 B2  
APPLICATION NO. : 12/045312  
DATED : May 13, 2014  
INVENTOR(S) : Jeff Bush Page 1 of 1

It is certified that error appears in the above-identified patent and that said Letters Patent is hereby corrected as shown below:

In the Claims

Column 20, line 3, after the word "has", insert the word --a--.

Column 20, line 28, delete the word "through".

Column 20, line 57, after the word "lost", insert the word --a--.

Column 20, line 67, after the word "and", insert the word --a--.

Signed and Sealed this  
Thirtieth Day of September, 2014

Michelle K. Lee  
*Deputy Director of the United States Patent and Trademark Office*